(12) United States Patent
Kato

(10) Patent No.: US 10,495,481 B2
(45) Date of Patent: Dec. 3, 2019

(54) EVALUATION INFORMATION COLLECTING DEVICE AND EVALUATION INFORMATION COLLECTING SYSTEM

(71) Applicant: MITSUBISHI ELECTRIC CORPORATION, Tokyo (JP)

(72) Inventor: Shin Kato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 136 days.

(21) Appl. No.: 15/565,655

(22) PCT Filed: Apr. 23, 2015

(86) PCT No.: PCT/JP2015/062417
§ 371 (c)(1),
(2) Date: Oct. 10, 2017

(87) PCT Pub. No.: WO2016/170649
PCT Pub. Date: Oct. 27, 2016

(65) Prior Publication Data
US 2018/0120124 A1 May 3, 2018

(51) Int. Cl.
*G01C 21/36* (2006.01)
*G08G 1/01* (2006.01)
*G01C 21/34* (2006.01)

(52) U.S. Cl.
CPC ....... *G01C 21/3694* (2013.01); *G08G 1/0112* (2013.01); *G01C 21/3453* (2013.01)

(58) Field of Classification Search
CPC ............ G01C 21/3697; G01C 21/3694; G01C 21/3453; G08G 1/0112; G08G 1/0133; G08G 1/0141; G08G 1/096716
See application file for complete search history.

(56) References Cited

U.S. PATENT DOCUMENTS

2007/0124064 A1   5/2007   Fukui et al.
2008/0068154 A1*  3/2008   Daurensan ............ G01C 21/367
                                                  340/539.13
(Continued)

FOREIGN PATENT DOCUMENTS

JP    2007-147567 A    6/2007
JP    2012-247273 A   12/2012
(Continued)

OTHER PUBLICATIONS

International Search Report for PCT/JP2015/062417 (PCT/ISA/210) dated Jul. 28, 2015.
(Continued)

*Primary Examiner* — Mussa A Shaawat
(74) *Attorney, Agent, or Firm* — Birch, Stewart, Kolasch & Birch, LLP

(57) ABSTRACT

An evaluation information collecting system includes a storing device storing evaluation information evaluating a certain point, a presentation device for presenting the evaluation information, and an evaluation information collector for acquiring evaluation information associated with a point through which a moving body passes and causing the presentation device to present the evaluation information, and the evaluation information collector includes an evaluation information acquirer for acquiring the evaluation information associated with the point through which the moving body passes from the storing device, a validity determiner for determining validity of the evaluation information based on status information representing a status of the moving body or a user passing through the point associated with the evaluation information, and a change content generator for changing content of the evaluation information in the storing device such that the evaluation information determined to be invalid is not easily presented.

5 Claims, 19 Drawing Sheets

(56) References Cited

U.S. PATENT DOCUMENTS

| | | | |
|---|---|---|---|
| 2012/0136570 A1 | 5/2012 | Yamashita et al. | |
| 2013/0082874 A1* | 4/2013 | Zhang | G01S 5/0072 |
| | | | 342/357.31 |
| 2013/0158850 A1* | 6/2013 | Uchida | G01C 21/3469 |
| | | | 701/123 |
| 2013/0238242 A1* | 9/2013 | Yoshizumi | G01C 21/3446 |
| | | | 701/533 |
| 2014/0002277 A1 | 1/2014 | Fulger et al. | |
| 2015/0170431 A1* | 6/2015 | Shimura | G08G 1/0962 |
| | | | 701/31.5 |
| 2015/0226570 A1* | 8/2015 | Takei | G01C 21/3484 |
| | | | 701/454 |
| 2016/0138930 A1 | 5/2016 | Akiyama et al. | |
| 2016/0216116 A1* | 7/2016 | Kourogi | G01C 21/12 |
| 2016/0238394 A1* | 8/2016 | Iimura | G06T 1/0014 |
| 2017/0039865 A1* | 2/2017 | Takabayashi | G08G 1/166 |
| 2017/0059345 A1* | 3/2017 | Sugawara | G01C 21/3492 |
| 2017/0115128 A1* | 4/2017 | Sengoku | G01C 21/3617 |
| 2017/0328719 A1* | 11/2017 | Yamamuro | G01C 21/26 |

FOREIGN PATENT DOCUMENTS

| | | |
|---|---|---|
| JP | 2013-050918 A | 3/2013 |
| JP | 2014-505914 A | 3/2014 |
| JP | 2016-095695 A | 5/2016 |
| WO | 2010/109805 A1 | 9/2010 |
| WO | 2014/057540 A1 | 4/2014 |

OTHER PUBLICATIONS

Office Action dated Jul. 4, 2017 of Japanese Patent Application No. 2017-513909.

* cited by examiner

FIG.3

| No. | Registered Coordinates | Positive/Negative Determination | Evaluation Comment | Type | Registration Date and Time | ... |
|---|---|---|---|---|---|---|
| 1 | 35.0, 139.4 | Positive | "Beautiful Night View" | View Information | May 20, 2014 20:45 | ... |
| 2 | 34.8, 135.2 | Negative | "Congested" | Congestion Information | July 10, 2014 15:23 | ... |
| 3 | 36.7, 139.9 | Negative | "Attention to Sharp Curve" | Dangerous Point Information | Sep. 2, 2014 12:45 | ... |
| 4 | 36.1, 137.3 | Positive | "Nice Restaurant" | Shop Information | Sep. 2, 2014 12:45 | ... |
| ... | ... | ... | ... | ... | ... | ... |

FIG. 7

| | Status Information | | | Status Comparison | | |
|---|---|---|---|---|---|---|
| | At Time of Registration | Present Time | Difference | Difference | Threshold Value | Difference Determination |
| Average Traveling Speed | 20km/h | 50km/h | 30km/h | | 20km/h | Recognized |
| Amount of Change in Acceleration Per Unit Time | 0.2G | 0.0G | 0.2G | | 0.1G | Recognized |
| Amount of Change in Steering Wheel Angle Per Unit Time | 30° | 10° | 20° | | 15° | Recognized |
| ... | ... | ... | ... | | ... | ... |

FIG.16

| No. | Registered Coordinates | Evaluation Comment | Registration Date and Time | Effective Time Zone (Daily) | Effective Time Zone (Weekly) | Effective Time Zone (Monthly) |
|---|---|---|---|---|---|---|
| | | | | ... | ... | ... |
| 1 | 35.0, 139.4 | "Congested" | Oct. 11, 2014 18:00 | — | — | — |
| ... | ... | ... | ... | ... | ... | ... |

FIG.17

| No. | Registered Coordinates | Evaluation Comment | Registration Date and Time | Effective Time Zone (Daily) | Effective Time Zone (Weekly) | Effective Time Zone (Monthly) |
|---|---|---|---|---|---|---|
| 1 | 35.0, 139.4 | "Congested" | Oct. 11, 2014 18:00 | 18:00-23:00 | Saturdays 18:00-23:00 | 11th 18:00-23:00 |
| ... | ... | ... | ... | ... | ... | ... |

FIG.18

| No. | Registered Coordinates | Evaluation Comment | Registration Date and Time | Effective Time Zone (Daily) | Effective Time Zone (Weekly) | Effective Time Zone (Monthly) | ... |
|---|---|---|---|---|---|---|---|
| 1 | 35.0, 139.4 | "Congested" | 2014/10/11 18:00 | × | Saturdays 18:00-23:00 | 11th 18:00-23:00 | ... |
| ... | ... | ... | ... | ... | ... | ... | ... |

FIG.19

| No. | Registered Coordinates | Evaluation Comment | Registration Date and Time | Effective Time Zone (Daily) | Effective Time Zone (Weekly) | Effective Time Zone (Monthly) | ... |
|---|---|---|---|---|---|---|---|
| 1 | 35.0, 139.4 | "Congested" | Oct. 11, 2014 18:00 | × | Saturdays 18:00-21:00 | 11th 18:00-23:00 | ... |
| ... | ... | ... | ... | ... | ... | ... | ... |

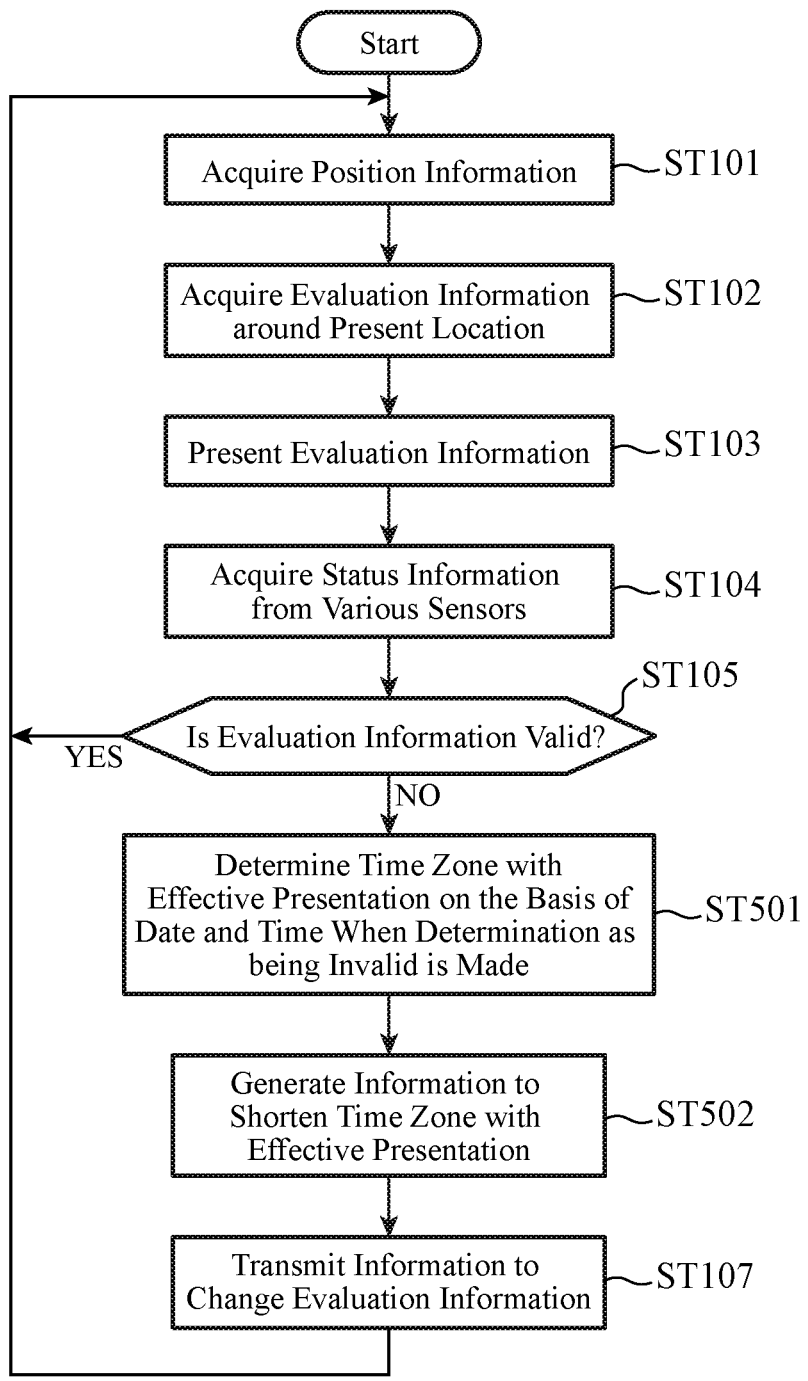

EVALUATION INFORMATION COLLECTING DEVICE AND EVALUATION INFORMATION COLLECTING SYSTEM

TECHNICAL FIELD

The present invention relates to an evaluation information collecting device and an evaluation information collecting system that collect and present evaluation information around a moving body.

BACKGROUND ART

When a user is driving a vehicle, the user may have various impressions such as a good impression or a bad impression with respect to a traveling road and its surrounding situation. It is convenient if an impression that the user has can be left on a map as evaluation information and shared with other users. For this reason, as disclosed in Patent Literature 1 for example, a navigation device which acquires posted traffic information posted for a point around the current location from a server and displays the information on a map has been proposed.

CITATION LIST

Patent Literature

Patent Literature 1: JP 2012-247273 A

SUMMARY OF INVENTION

Technical Problem

Meanwhile, although evaluation information collected from a user is superior in terms of real-time property with respect to occurrence of traffic congestion or an accident, the evaluation information sometimes remains in a server even after the traffic congestion is eliminated or the accident is handled. Thus, there is a disadvantage that evaluation information different from the current situation is displayed on a map. Regarding this disadvantage, the navigation device of Patent Literature 1 described above deletes the evaluation information to be displayed on the map when the evaluation information contradicts distributed surrounding traffic information such as VICS (registered trademark) information. As a result of this, of evaluation information having high relevancy of content with distributed information, old information which is different from the current situation can be deleted by judging the validity. However, there is a disadvantage that the validity cannot be determined for evaluation information having content not distributed such as subjective evaluation information such as "A lot of vehicles and difficult to drive" and evaluation information of a view such as "Beautiful flowers are blooming".

The present invention has been devised to solve the disadvantages as described above with an object of allowing for determination on evaluation information, validity of which cannot be determined on the basis of distributed information.

Solution to Problem

An evaluation information collecting device according to the invention includes an evaluation information acquirer for acquiring evaluation information associated with a point through which a moving body passes from a storing device, a validity determiner for determining validity of the evaluation information acquired by the evaluation information unit acquirer on the basis of status information representing a status of the moving body or a user passing through the point associated with the evaluation information, and a change content generating unit for changing content of the evaluation information stored in the storing device such that the evaluation information determined by the validity determine to be invalid is not easily presented; and a presentation range determiner to reduce a presentation range for presenting the evaluation information when the validity determiner determines that the evaluation information is invalid. The change content generating unit changes content of the evaluation information stored in the storing device such that the evaluation information is not easily presented as the number of times the validity determiner determines that the evaluation information is invalid increases and changes a presentation range of the evaluation information stored in the storing device to a presentation range reduced by a presentation range determiner.

Advantageous Effects of Invention

According to the present invention, validity of evaluation information is determined on the basis of a status of a moving body or a user passing through a point associated with the evaluation information, and invalid evaluation information is not easily presented. Thus, it is possible to determine even evaluation information whose validity cannot be determined on the basis of distributed information. Thus, it is possible to present only valid evaluation information by not presenting evaluation information which has become invalid when the moving body passes.

BRIEF DESCRIPTION OF DRAWINGS

FIG. 3 is a diagram illustrating an example of evaluation information stored in an evaluation information storing unit of the evaluation information collecting system according to the first embodiment.

FIG. 7 is a diagram for explaining operations of a validity determining unit of the evaluation information collecting device according to the first embodiment.

FIG. 16 is a diagram illustrating an example of evaluation information stored in an evaluation information storing unit in the evaluation information collecting system according to the fifth embodiment.

FIG. 17 is a diagram illustrating an example in which an effective time zone is changed from the evaluation information in FIG. 16.

FIG. 18 is a diagram illustrating an example in which an effective time zone is changed from the evaluation information in FIG. 17.

FIG. 19 is a diagram illustrating an example in which an effective time zone is changed from the evaluation information in FIG. 18.

FIG. 20 is a flowchart illustrating operations of an evaluation information collecting device according to the fifth embodiment.

DESCRIPTION OF EMBODIMENTS

To describe the invention further in detail, embodiments for carrying out the invention will be described below with reference with accompanying drawings.

First Embodiment

Figure 1:
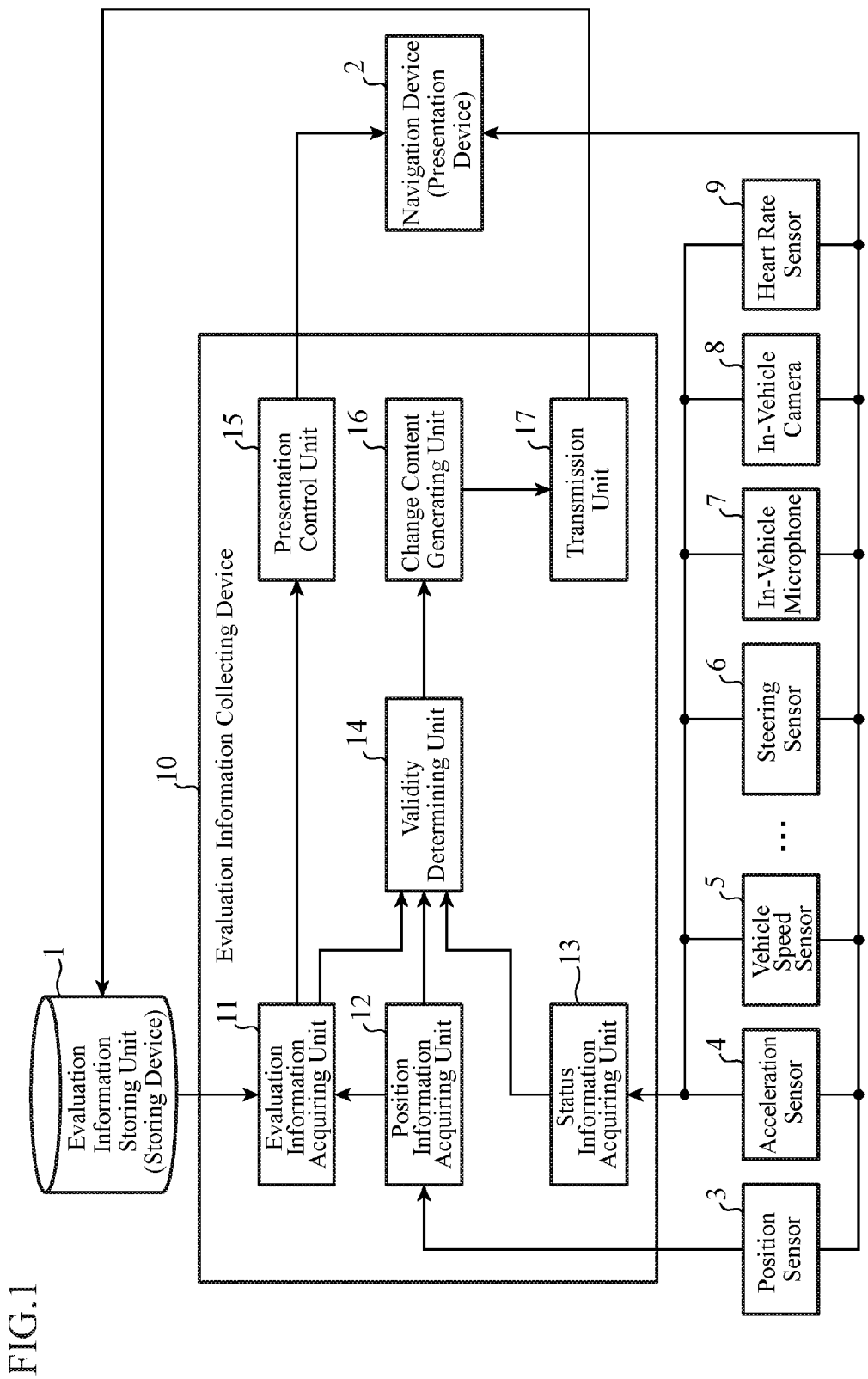
FIG. 1 is a block diagram illustrating an exemplary configuration of an evaluation information collecting system according to a first embodiment of the invention.

FIG. 1 is a block diagram illustrating an exemplary configuration of an evaluation information collecting system according to a first embodiment of the invention.

The evaluation information collecting system according to the present invention collects evaluation information such as evaluation comments for evaluating surroundings of a vehicle position posted by a user of the vehicle such as a driver of the vehicle in association with a user's vehicle position and shares the collected evaluation information among a plurality of vehicles.

Figure 2:
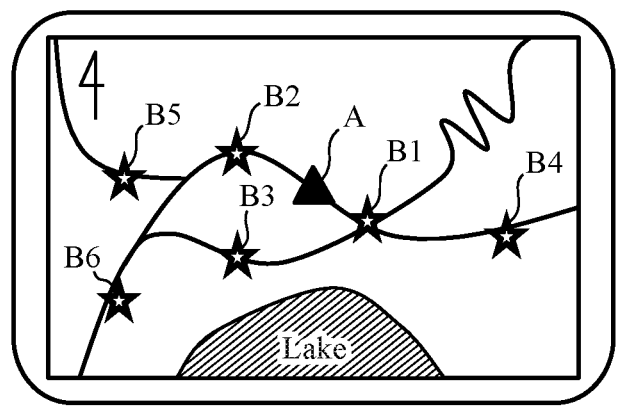
FIG. 2 is a diagram illustrating an exemplary screen of a map that the navigation device displays on a display.

In each embodiment of the present invention, an evaluation information collecting device 10 is used in combination with a navigation device 2 and evaluation information acquired by the evaluation information collecting device 10 from an evaluation information storing unit 1 is displayed on a map by the navigation device 2, thereby sharing the evaluation information among a plurality of vehicles. For example, as illustrated in FIG. 2, the navigation device 2 displays, on a display, a screen on which evaluation information B1 to B6 on the vicinity of a user's vehicle position A is arranged on the map.

In addition, in the evaluation information collecting system, when the user's vehicle approaches a point associated with evaluation information, the evaluation information collecting device 10 detects status information representing statuses of the vehicle and its surroundings, conversation in the vehicle, a reaction of the user, or other information by various sensors. When the status information and the evaluation information are inconsistent or when the status information is different between the present time and time when the evaluation information is registered, this evaluation information is determined to be invalid. When the evaluation information collecting device 10 determines that the evaluation information is invalid, the evaluation information collecting device 10 changes content of the evaluation information stored in the evaluation information storing unit 1 such that the evaluation information is not easily presented.

In addition to the evaluation information collecting device 10, the evaluation information storing unit 1, and the navigation device 2 described above, the evaluation information collecting system further includes various sensors such as a position sensor 3 for acquiring a position of the vehicle, an acceleration sensor 4 for acquiring the acceleration of the vehicle, a vehicle speed sensor 5 for acquiring a vehicle speed, a steering sensor 6 for detecting the angle of a steering wheel, an in-vehicle microphone 7 for acquiring a user's utterance and conversation in the vehicle, an in-vehicle camera 8 for imaging the interior of the vehicle, and a heart rate sensor 9 for detecting a heart rate of the user. Note that it is not necessary to include all of the sensors illustrated, but it is sufficient that at least one of them is included. In addition to the sensors illustrated, a sensor for detecting operation of an accelerator or a brake may be further included.

Hereinafter, information detected by at least one of the various sensors is referred to as "status information" representing the status of the vehicle or the user.

The evaluation information collecting device 10, the navigation device 2, and the various sensors described above are mounted on the vehicle. The evaluation information collecting device 10 includes an evaluation information acquiring unit 11, a position information acquiring unit 12, a status information acquiring unit 13, a validity determining unit 14, a presentation control unit 15, a change content generating unit 16, and a transmission unit 17. The navigation device 2 includes a display and a speaker.

In the present invention, the display and the speaker of the navigation device 2 are used as presentation devices for presenting evaluation information; however, the evaluation information collecting device 10 itself may include presentation devices, that is, a display and a speaker.

The evaluation information storing unit 1 is located outside the vehicle and is capable of transmitting and receiving information to and from the in-vehicle evaluation information collecting device 10 via a network. The evaluation information storing unit 1 includes a storing device and collects evaluation information from the evaluation information collecting device 10 mounted to a certain vehicle, stores the evaluation information, and transmits the stored evaluation information to an evaluation information collecting device 10 mounted to another vehicle. This allows the evaluation information to be shared among a plurality of vehicles.

FIG. 3 shows an example of evaluation information stored in the evaluation information storing unit 1.

In evaluation information, at least one of an evaluation comment registered by a user such as a driver, a positive/negative determination according to which whether content of the evaluation comments such as "This road is easy to drive" and "This road is difficult to drive" is positive or negative is determined, and a type of evaluation comment is associated with registered coordinates representing the user's vehicle position when the evaluation comment and other information are registered. Note that the evaluation information may include a date and time of registration, weather, status information, a flag to be described later indicating whether evaluation information is presented, and other information.

Figure 4:
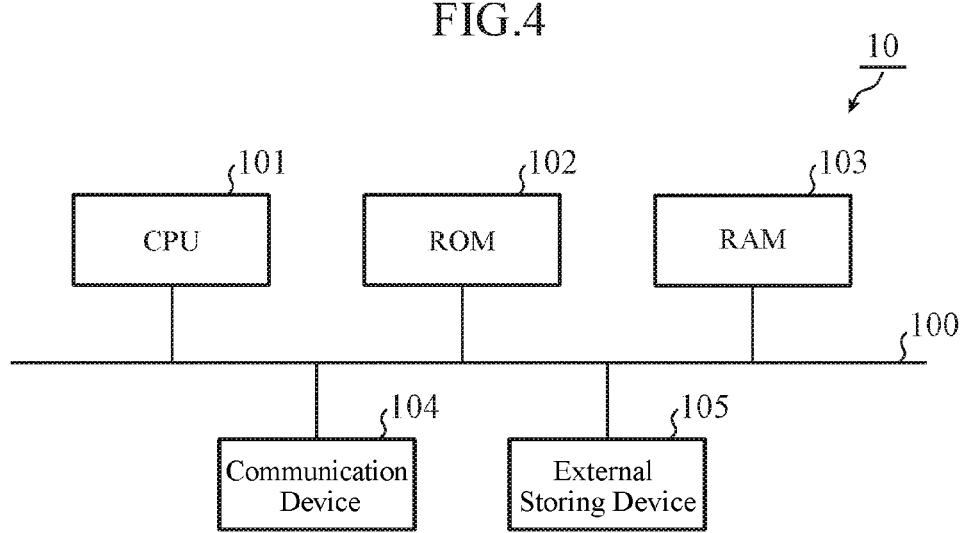
FIG. 4 is a hardware configuration diagram of an evaluation information collecting device according to the first embodiment.

FIG. 4 is a diagram illustrating an exemplary hardware configuration of the evaluation information collecting device 10.

Bus 100 is connected to a central processing unit (CPU) 101, a read only memory (ROM) 102, a random access memory (RAM) 103, a communication device 104, and an external storing device 105.

By reading and executing various programs stored in the ROM 102 or the external storing device 105, the CPU 101 cooperates with respective pieces of hardware to implement functions of the validity determining unit 14, the presentation control unit 15, and the change content generating unit 16 of the evaluation information collecting device 10.

The RAM 103 is a memory used upon execution of a program.

The communication device 104 is a communication terminal that downloads information from an external server and uploads information to an external server via a network and implements a function of the evaluation information acquiring unit 11 of acquiring evaluation information from the evaluation information storing unit 1 and a function of the transmission unit 17 of transmitting evaluation information to the evaluation information storing unit 1.

The communication device 104 is a communication terminal that acquires information from various sensors mounted to a vehicle via a vehicle network (e.g. controller area network) and implements functions of the position information acquiring unit 12 and the status information acquiring unit 13 of acquiring information from various sensors.

The external storing device 105 is a storing device such as an HDD, a CD or a DVD, or a storing device employing a semiconductor memory such as a USB memory or an SD card or other devices.

The evaluation information acquiring unit 11 receives position information from the position information acquiring unit 12 and acquires evaluation information registered as the vicinity of the current location indicated by the position information from the evaluation information storing unit 1. The evaluation information acquiring unit 11 outputs the acquired evaluation information to the validity determining unit 14 and the presentation control unit 15.

The position information acquiring unit 12 acquires position information indicating the current location of the user's vehicle from the position sensor 3 and outputs the position information to the evaluation information acquiring unit 11 and the validity determining unit 14.

The status information acquiring unit 13 acquires information from at least one sensor out of the acceleration sensor 4, the vehicle speed sensor 5, the steering sensor 6, the in-vehicle microphone 7, the in-vehicle camera 8, and the heart rate sensor 9 and outputs the acquired information to the validity determining unit 14 as status information.

The validity determining unit 14 receives the evaluation information from the evaluation information acquiring unit 11 and receives the status information from the status information acquiring unit 13. The validity determining unit 14 determines validity of the evaluation information associated with the vicinity of the current location and outputs, to the change content generating unit 16, a command to change the evaluation information in such a manner that when the evaluation information is determined to be invalid, the evaluation information is not easily presented. The validity determining unit 14 determines that the evaluation information is invalid when there is a change in situation at a point where the evaluation information has been registered, such as, when the status information and the evaluation information are inconsistent or when the status information is different between the present time and time when the evaluation information has been registered.

Note that the validity determining unit 14 may receive the position information from the position information acquiring unit 12 and calculate a vehicle speed when the status information received from the status information acquiring unit 13 does not include the vehicle speed.

As an example, a case is shown where, at a point where evaluation information including an evaluation comment of "This road is difficult to drive" is registered, the evaluation information is no longer valid since the difficulty in driving has been solved and the situation has been changed as a result of road construction after the registration. When passing through the vicinity of this point, the evaluation information collecting device 10 acquires operations of a brake, an accelerator, and a steering wheel, a vehicle speed, a conversation inside the vehicle, etc. as status information.

Validity of the evaluation information is determined on the basis of, for example, the status of the vehicle. The validity determining unit 14 determines that the evaluation information of "This road is difficult to drive" is invalid when there is a difference between the status of the vehicle and a predetermined threshold value, such as, when the number of times a brake pedal is stepped on is smaller than a threshold value, the frequency of steering wheel operation is less than a threshold value, or a change in the vehicle speed is less than a threshold value. A threshold value for determining validity may be defined as an absolute value in the external storing device 105 or may be defined as a relative value using, as a reference, status information of a brake or the like at the time of registration of the evaluation information included in the evaluation information.

Alternatively, validity may be determined on the basis of utterance content of the user. For example, when the utterance with predetermined content such as "This road has become easier to drive" is included in a conversation inside the vehicle collected by the in-vehicle microphone 7, the validity determining unit 14 determines that the evaluation information of "This road is difficult to drive" is invalid.

Alternatively, validity may be determined on the basis of a reaction of the user. For example, the validity determining unit 14 may determine validity from an expression of the face of the user captured by the in-vehicle camera 8, or may estimate a degree of tension of the user from a heart rate detected by the heart rate sensor 9 and determine that the evaluation information of "This road is difficult to drive" is invalid when the degree of tension is lower than a threshold value.

Note that the evaluation information collecting device 10 may determine validity of the evaluation information on the basis of one type of status information or may comprehensively determine the validity on the basis of a plurality of types of status information.

The presentation control unit 15 receives the evaluation information from the evaluation information acquiring unit 11 and commands the navigation device 2 to present the evaluation information to the user.

In accordance with the command from the presentation control unit 15, the navigation device 2 displays, for example, a display screen as illustrated in FIG. 2 on the display. Note that a method of presenting the evaluation information is not limited to displaying by the display, but may be sound output from a speaker or other means.

The change content generating unit 16 receives from the validity determining unit 14 the command to change the evaluation information so as not to be presented easily. When the validity determining unit 14 determines that the evaluation information is invalid, the command is received from the validity determining unit 14, information for changing the content of the evaluation information is generated such that the evaluation information is not easily presented, and the information is output to the transmission unit 17. In the first embodiment, the information generated by the change content generating unit 16 is, for example, information that changes the flag as to whether the evaluation information is presented, to negative, information to delete the evaluation information from the evaluation information storing unit 1, or other information.

The transmission unit 17 receives the information for changing content of the evaluation information from the change content generating unit 16 and transmits the information to the evaluation information storing unit 1.

The evaluation information storing unit 1 changes the content of the stored evaluation information in accordance with the information received from the transmission unit 17. When a change content is the information to change the flag as to whether the evaluation information is presented to negative, the evaluation information storing unit 1 changes the flag of the evaluation information. The evaluation information with a flag of no presentation is processed not to be transmitted from the evaluation information storing unit 1 to the evaluation information acquiring unit 11 or not to be presented in the presentation control unit 15.

Figure 5:
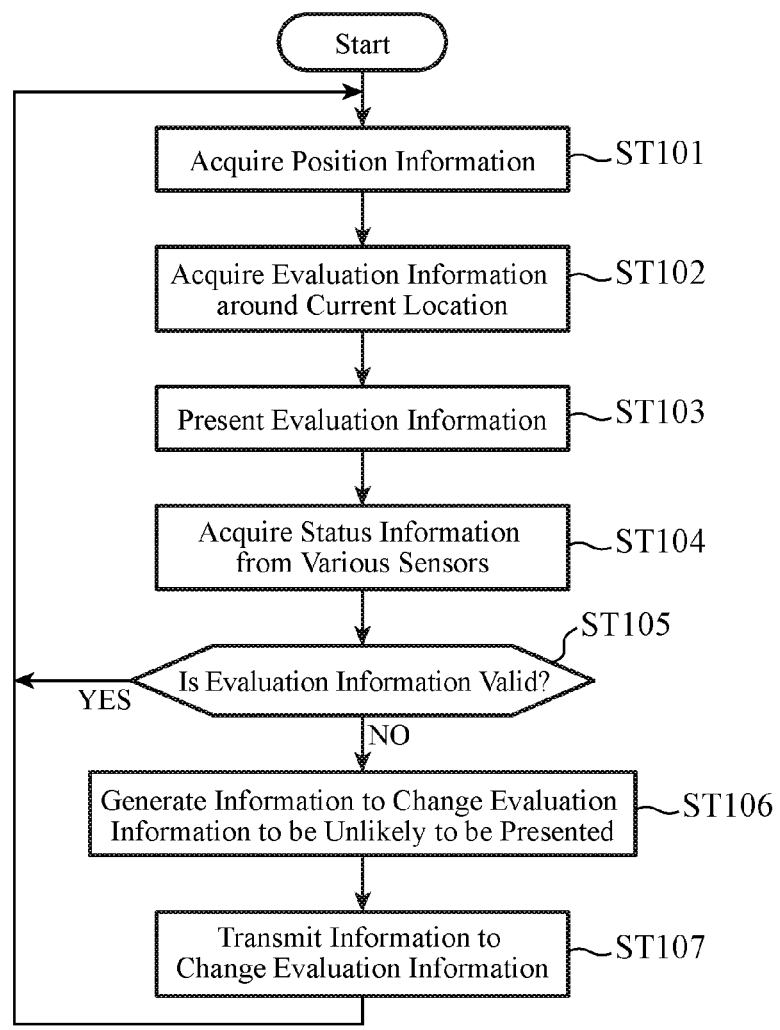
FIG. 5 is a flowchart illustrating operations of the evaluation information collecting device according to the first embodiment.

Next, with reference to a flowchart illustrated in FIG. 5, operations of the evaluation information collecting device 10 according to the first embodiment will be described. The evaluation information collecting device 10 repeats operations illustrated in this flowchart during a period from when an engine of the vehicle is turned on until when it is turned off or a period from when the evaluation information collecting device 10 is turned on until when it is turned off.

The position information acquiring unit 12 acquires position information of the vehicle from the position sensor 3 and outputs the information to the evaluation information acquiring unit 11 (step ST101). On the basis of the position information received from the position information acquiring unit 12, the evaluation information acquiring unit 11 acquires evaluation information on the vicinity of the current location from the evaluation information storing unit 1 and outputs the evaluation information to the validity determining unit 14 and the presentation control unit 15 (step ST102). The presentation control unit 15 commands the navigation device 2 to present the evaluation information received from the evaluation information acquiring unit 11 and causes the evaluation information to be presented on a map or the like (step ST103).

Subsequently, the status information acquiring unit 13 acquires status information from the various sensors and outputs the information to the validity determining unit 14 (step ST104). The validity determining unit 14 determines validity of the evaluation information received from the evaluation information acquiring unit 11 on the basis of the status information received from the status information acquiring unit 13 (step ST105). When the validity determining unit 14 determines that the evaluation information is valid ("YES" in step ST105), no command is output from the validity determining unit 14 to the change content generating unit 16. The process returns to step ST101 without operation of the change content generating unit 16. Contrarily, when the validity determining unit 14 determines that the evaluation information is invalid ("NO" in step ST105), the change content generating unit 16 generates information to change the evaluation information so as not to be presented easily in accordance with the command received from the validity determining unit 14 (step ST106) and transmits the information to the evaluation information storing unit 1 from the transmission unit 17 (step ST107).

Note that, in the flowchart illustrated in FIG. 5, the processing of presenting the evaluation information in step ST103 is performed subsequently to the processing of acquiring the evaluation information on the vicinity of the current location in step ST102; however, the timing of presenting the evaluation information is not limited thereto.

Figure 6:
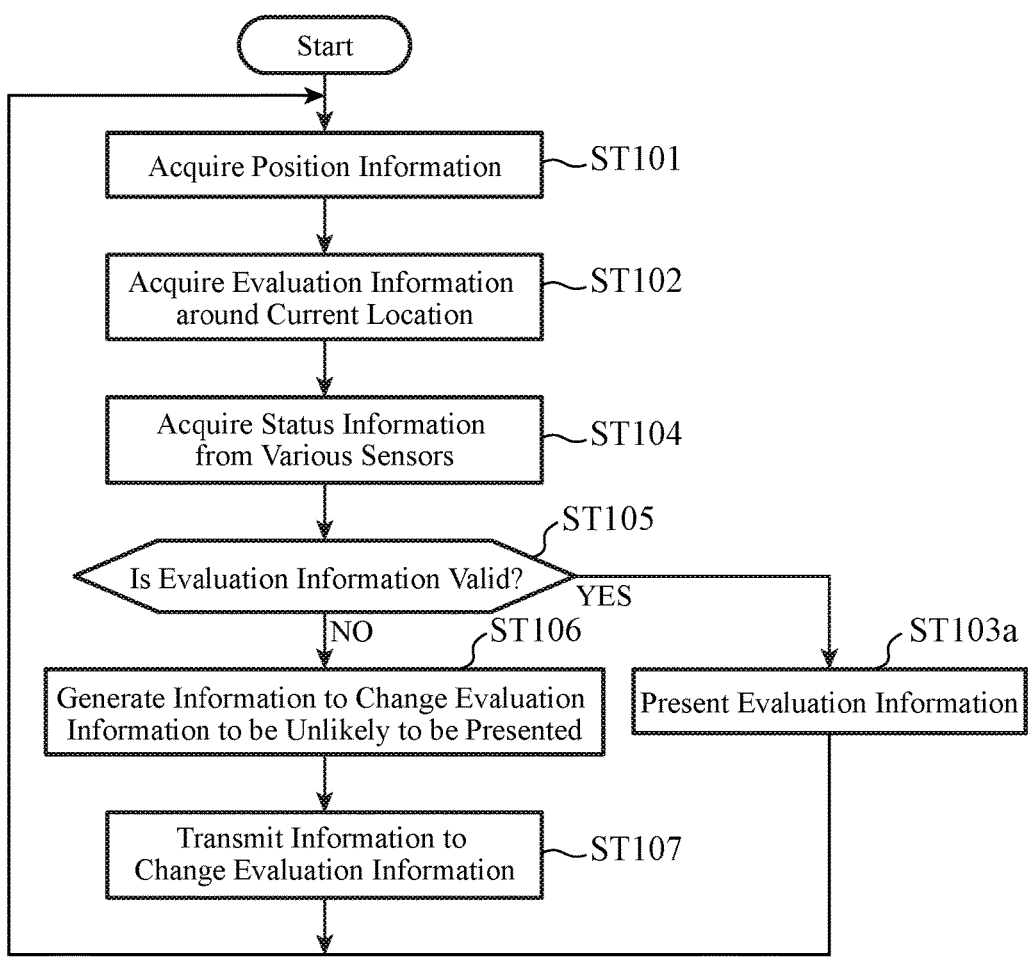
FIG. 6 is a flowchart illustrating a modification of the operations of the evaluation information collecting device according to the first embodiment.

Here, a modification of the timing of presenting the evaluation information is illustrated in FIG. 6. In the flowchart of FIG. 6, if the validity determining unit 14 determines that the evaluation information is valid in step ST105 ("YES" in step ST105), the presentation control unit 15 presents the evaluation information in step ST103*a*.

Next, the processing having been described with the flowchart in FIG. 5 will be described below with a specific example.

Descriptions will be given on a case where, at a point where evaluation information including an evaluation comment of "This road is difficult to drive" is registered, the evaluation information is no longer valid since the difficulty in driving has been solved as a result of construction after the registration.

When a user's vehicle approaches the point where this evaluation information is registered, the evaluation information acquiring unit 11 first acquires the evaluation information of "This road is difficult to drive" on the vicinity of the current location (steps ST101 and ST102).

Subsequently, the evaluation information acquiring unit 11 outputs the evaluation information to the presentation control unit 15 and the presentation control unit 15 commands the navigation device 2 to display, in a superimposed manner, the evaluation information of "This road is difficult to drive" on a map displayed on the display by the navigation device 2 (step ST103).

Subsequently, the status information acquiring unit 13 acquires the status information from the various sensors (step ST104). Here, it is assumed that the status information acquired by the status information acquiring unit 13 has content as in a "present time" column of "status information" illustrated in FIG. 7. Note that the status information acquired from the various sensors at the time of registration of the evaluation information has content as in a "at time of registration" column and it is assumed that the status information is stored in the evaluation information storing unit 1 as a part of the evaluation information.

Subsequently, the validity determining unit 14 determines validity of the evaluation information of "This road is difficult to drive" on the basis of the status information acquired by the status information acquiring unit 13 (step ST105). Here, validity is determined on the basis of whether there is a difference between the status information at the time of registering the evaluation information and the current status information. The validity determination result is as illustrated in "status comparison" in FIG. 7. For example, at the time of registering the evaluation information, an average traveling speed of a vehicle is low, acceleration/deceleration is frequently performed and the amount of change in acceleration is large, and the amount of change in the steering wheel angle is also large as the steering wheel is turned repeatedly. Contrarily, at the present time the average traveling speed of the vehicle is high and the amount of change in the acceleration and the steering wheel angle is small. Therefore, it seems that it is easier to drive. The validity determining unit 14 calculates a difference for each of the items, compares the difference with a predetermined threshold value, and when the difference is larger than or equal to the threshold value, provides a difference determination of "recognized", and when the difference is smaller than the threshold value, provides a difference determination of "not recognized". For example, when one or more items have the difference determination of "recognized" or when the number of items having the difference determination of "recognized" is larger than the number of items having the difference determination of "not recognized", the validity determining unit 14 determines that the evaluation information of "This road is difficult to drive" is invalid ("NO" in step ST105).

In the example of FIG. 7, the evaluation information is determined to be invalid and thus the change content generating unit 16 generates information for changing the evaluation information so as not to be presented easily (step ST106). Lastly, the information for changing the evaluation information generated by the change content generating unit 16 is transmitted from the transmission unit 17 to the evaluation information storing unit 1 (step ST107) and the evaluation information storing unit 1 changes content of the stored evaluation information in accordance with the information.

According to the first embodiment as described above, the evaluation information collecting device 10 include the evaluation information acquiring unit 11 for acquiring evaluation information associated with a point through which a vehicle passes from the evaluation information storing unit 1, the validity determining unit 14 for determining validity of the evaluation information acquired by the evaluation information acquiring unit 11 on the basis of status information representing a status of the vehicle or the user passing through the point associated with the evaluation information, and the change content generating unit 16 for changing content of the evaluation information stored in the evaluation information storing unit 1 such that the evaluation information determined by the validity determining unit 14 to be invalid is not easily presented. Therefore, even evaluation information whose validity cannot be determined on the basis of distributed information such as traffic information can be also determined. Therefore, it is possible to present only valid evaluation information by not presenting evaluation information that is no longer valid when the vehicle passes.

Furthermore, according to the first embodiment, the validity determining unit 14 determines validity of the evaluation information on the basis of the status information representing at least one of a status of the vehicle when the evaluation information acquired by the evaluation information acquiring unit 11 is presented, utterance content of the user, and a reaction of the user. This allows evaluation information, whose validity can be objectively determined, so as not to be presented automatically without requiring a user's effort.

Second Embodiment

In the first embodiment, validity of evaluation information is determined on the basis of status information detected by the various sensors, however in a second embodiment, validity of evaluation information is determined by inquiring a user.

Figure 8:
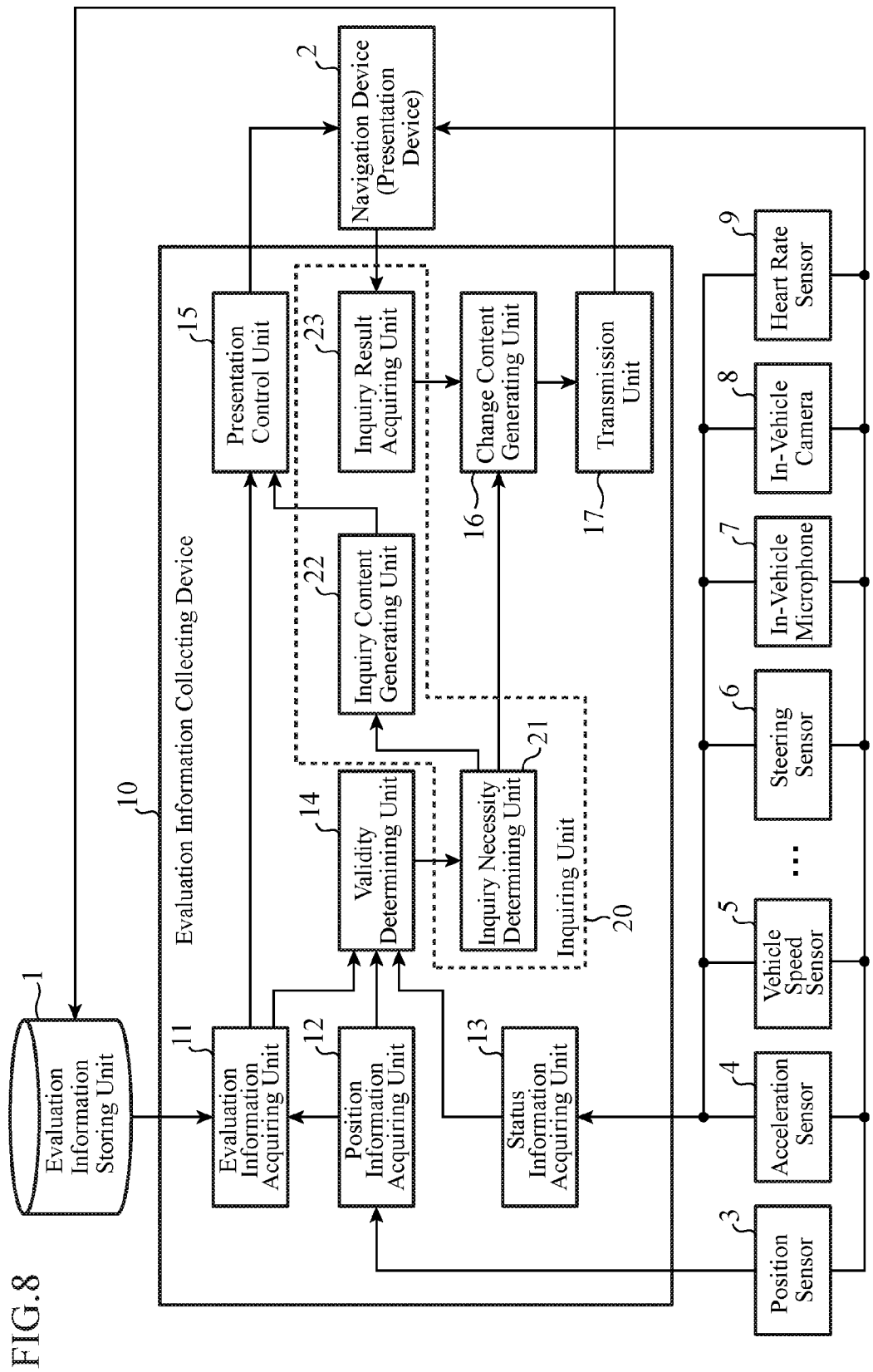
FIG. 8 is a block diagram illustrating an exemplary configuration of an evaluation information collecting system according to a second embodiment of the invention.

FIG. 8 is a block diagram illustrating an exemplary configuration of an evaluation information collecting system according to the second embodiment of the invention. The evaluation information collecting system according to the second embodiment has a configuration in which an inquiring unit 20 is added to the evaluation information collecting device 10 of the first embodiment illustrated in FIG. 1. In FIG. 8, the same or corresponding parts as those in FIG. 1 are denoted by the same symbols and descriptions thereof are omitted.

The inquiring unit 20 includes an inquiry necessity determining unit 21, an inquiry content generating unit 22, and an inquiry result acquiring unit 23.

The inquiry necessity determining unit 21 receives a validity determination result of the evaluation information from the validity determining unit 14 and determines whether to inquire of a user such as a driver as to whether this determination is correct with respect to the evaluation information having been determined to be invalid. For example, in the case of evaluation information whose validity can be determined on the basis of objective criteria such as traffic congestion, the inquiry necessity determining unit 21 determines that no inquiry is necessary. On the other hand, in the case of evaluation information whose validity cannot be determined on the basis of objective criteria such as a beautiful view, the inquiry necessity determining unit 21 determines that an inquiry is necessary. In addition, the inquiry necessity determining unit 21 determines necessity of inquiry by using a certainty factor of the validity determination result. When determining that an inquiry is unnecessary for the evaluation information determined by the validity determining unit 14 to be invalid, the inquiry necessity determining unit 21 outputs, to the change content generating unit 16, a command to change the evaluation information so as not to be presented easily and, when determining that an inquiry is necessary, commands the inquiry content generating unit 22 to make an inquiry.

When receiving a command to make an inquiry from the inquiry necessity determining unit 21, the inquiry content generating unit 22 generates content of the inquiry and outputs the content of the inquiry to the presentation control unit 15. The inquiry content generating unit 22 may uniformly generate the content of the inquiry. Here, however, by changing the content of the inquiry in accordance with the certainty factor of the validity determination result and making an inquiry in accordance with the current status, a user is urged to respond to the inquiry. For example, when a certainty factor of the validity determination result of the validity determining unit 14 is low with respect to the evaluation information of "This road is difficult to drive", the inquiry content generating unit 22 generates a simple inquiry message of "Is it still difficult to drive?" since there is a possibility that it is still difficult to drive. Conversely, when the certainty factor is high, there is a high possibility that it is easier to drive, so the inquiry content generating unit 22 generates an inquiry message of "Is it no longer difficult to drive?" Note that a certainty factor will be described later.

When receiving the inquiry message from the inquiry content generating unit 22, the presentation control unit 15 executes inquiry to the user by commanding the navigation device 2 to display the inquiry message on a display or to cause a speaker to output a sound therefrom. The navigation device 2 acquires the user's response to the inquiry and outputs the response to the inquiry result acquiring unit 23 as an inquiry result. Note that the navigation device 2 may acquire the user's response by any means such as generating an inquiry result by recognition processing of utterance sound of the user input from an in-vehicle microphone 7 or generating an inquiry result by detecting a user operation on a software button of a touch panel.

The inquiry result acquiring unit 23 acquires the inquiry result from the navigation device 2 and determines whether the evaluation information is valid on the basis of the inquiry result. When determining that the evaluation information is invalid, the inquiry result acquiring unit 23 outputs to the change content generating unit 16 a command to change the evaluation information so as not to be presented easily.

In accordance with the command from the validity determining unit 14 via the inquiry necessity determining unit 21 or the command from the inquiry result acquiring unit 23, the change content generating unit 16 generates information to change the evaluation information so as not to be presented easily and outputs the information to the transmission unit 17.

Figure 9:
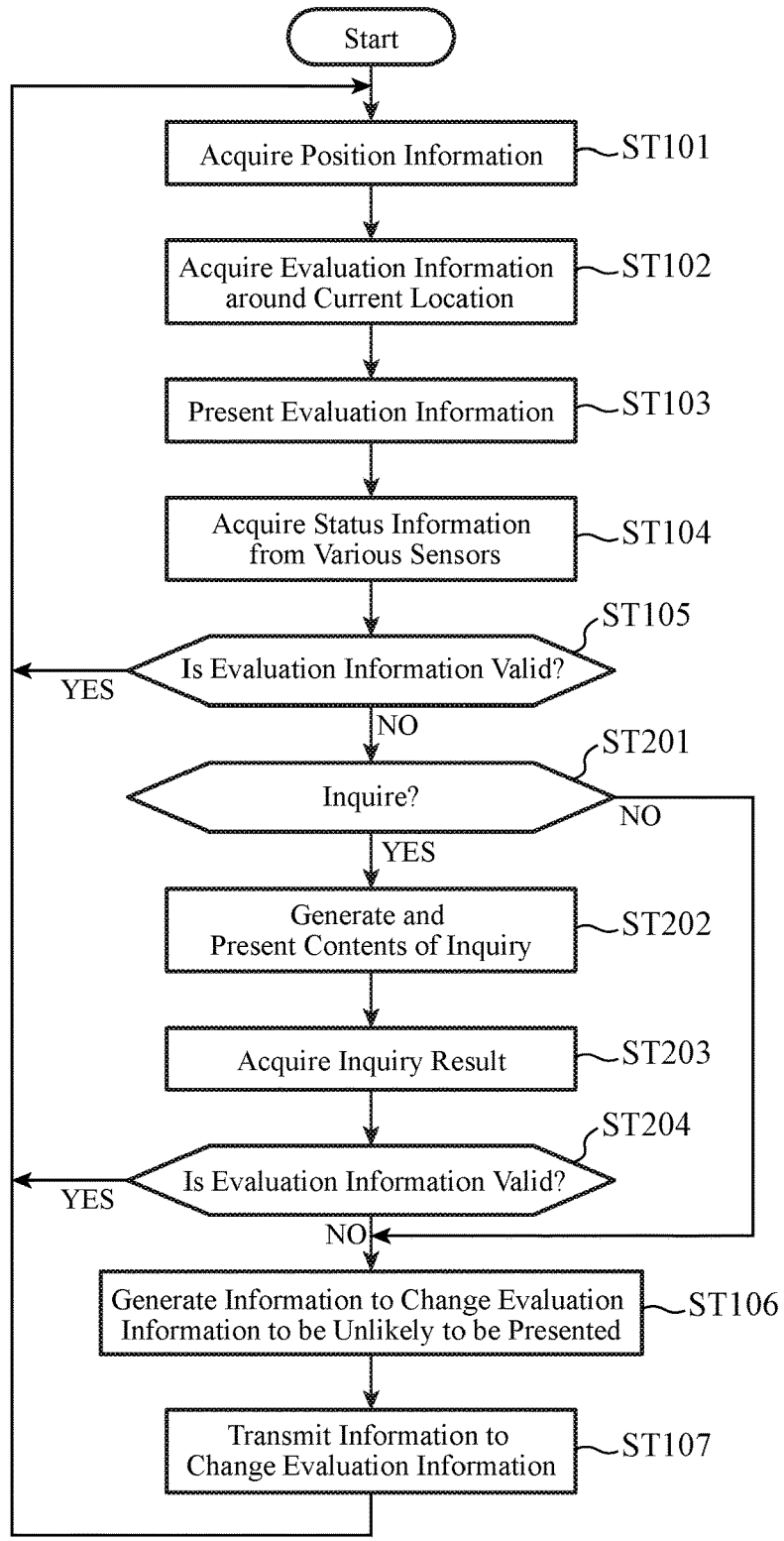
FIG. 9 is a flowchart illustrating operations of the evaluation information collecting device according to the second embodiment.

Next, with reference to a flowchart illustrated in FIG. 9, operations of the evaluation information collecting device 10 according to the second embodiment will be described. Here, steps ST101 to ST107 illustrated in FIG. 9 are the same as those in the flowchart illustrated in FIG. 5 of the first embodiment and thus descriptions thereof are omitted.

In step ST105, if the validity determining unit 14 determines that the evaluation information is invalid ("NO" in step ST105), the inquiry necessity determining unit 21 receives the validity determination result and determines whether to inquire of a user with respect to validity on the basis of predetermined conditions as to whether validity of the evaluation information can be objectively determined or whether a certainty factor of the validity determination by the validity determining unit 14 is high or low (step ST201). If the inquiry necessity determining unit 21 determines that an inquiry to the user is unnecessary ("NO" in step ST201), the inquiry necessity determining unit 21 outputs a command to change the evaluation information so as not to be presented easily to the change content generating unit 16. The process then proceeds to step ST106.

On the other hand, if determining that an inquiry to the user is necessary ("YES" in step ST201), the inquiry necessity determining unit 21 commands the inquiry content generating unit 22 to make an inquiry. In the following step ST202, when receiving a command to make an inquiry from the inquiry necessity determining unit 21, the inquiry content generating unit 22 generates inquiry content and outputs the content to the presentation control unit 15. The presentation control unit 15 commands the navigation device 2 to present the inquiry to the user on the basis of the content received from the inquiry content generating unit 22.

Subsequently, the inquiry result acquiring unit 23 acquires a result inquiring of the user from the navigation device 2 (step ST203) and determines validity of the evaluation information on the basis of the inquiry result (step ST204). If the inquiry result acquiring unit 23 determines that the evaluation information is valid ("YES" in step ST204), the process returns to step ST101. On the other hand, if the inquiry result acquiring unit 23 determines that the evaluation information is invalid ("NO" in step ST204), the inquiry result acquiring unit 23 outputs a command to change the evaluation information so as not to be presented easily to the change content generating unit 16. When receiving this command, the change content generating unit 16 generates information to change the evaluation information so as not to be presented easily (step ST106) and transmits the information from the transmission unit 17 to the evaluation information storing unit 1 (step ST107).

Note that, in the flowchart illustrated in FIG. 9, the processing of presenting the evaluation information is performed in step ST103; however, the evaluation information may not be presented at this timing. The processing of presenting the evaluation information may be performed when the evaluation information is determined to be valid for example in step ST105 ("YES" in step ST105) or when making an inquiry to the user is determined in step ST201 ("YES" in step ST201).

Furthermore, when the evaluation information is determined to be valid ("YES" in step ST105 and "YES" in step ST204), the change content generating unit 16 may generate information to change this evaluation information to be presented easily and transmit the information from the transmission unit 17 to the evaluation information storing unit 1.

Next, the processing having been described with the flowchart in FIG. 9 will be described below with a specific example.

Descriptions will be given on a case where, at a point where evaluation information including an evaluation comment of "This road is difficult to drive" is registered, the difficulty in driving has been solved with construction, etc. having been performed. It is assumed that the validity determination result of the validity determining unit 14 has content such as "status comparison" illustrated in FIG. 7.

The inquiry necessity determining unit 21 determines whether validity of the evaluation information of "This road is difficult to drive" can be objectively determined (step ST201). For example, whether objective determination can be made is defined in advance for each type of evaluation information and the inquiry necessity determining unit 21 makes a determination in accordance with these definitions. It is assumed that types such as congestion information and dangerous point information can be objectively determined and types such as impressions of ease of driving, view information, and shop information cannot be objectively determined. It is assumed that the evaluation information of "This road is difficult to drive" cannot be objectively determined and requires an inquiry.

Alternatively, the inquiry necessity determining unit 21 may determine whether making an inquiry is necessary on the basis of a certainty factor of the validity determination result in the validity determining unit 14. For example, three certainty factors of "high", "medium", and "low" are defined for each item of status information. The inquiry necessity determining unit 21 assigns a score in accordance with a certainty factor defined for the item of difference determination "recognized" and, when a total value of the scores of all items is smaller than a predetermined score threshold value, that is, when a certainty factor is low, determines that making an inquiry is necessary. When the total value of the scores is larger than or equal to the score threshold value, the inquiry necessity determining unit 21 determines that making an inquiry is not necessary.

Subsequently, the inquiry content generating unit 22 generates content of the inquiry (step ST202). For example, for the evaluation information of "This road is difficult to drive", each item of the status information is "recognized" as illustrated in "difference determination" of "status comparison" in FIG. 7, and thus there is a high possibility that this evaluation information is invalid. For that reason, changing content of the inquiry to be generated to content opposite to the content of the evaluation information results in a more natural inquiry. Thus, for example for each type of evaluation information, a template of an inquiry wording is defined in advance in accordance with a certainty factor of the validity determination result. In a situation where the certainty factor is high, the inquiry content generating unit 22 selects an inquiry wording which is opposite to the evaluation content from among the templates. Alternatively, the inquiry content generating unit 22 may analyze the content of the evaluation information using general morphological analysis and an antonym dictionary and may generate an inquiry wording opposite to this content, that is, "Is this road easy to drive?" The inquiry content generating unit 22 makes an inquiry by displaying the content of the inquiry generated by these methods as a telop on the display of the navigation device 2 or outputting a sound from the speaker via the presentation control unit 15.

Subsequently, the inquiry result acquiring unit 23 acquires an inquiry result from the navigation device 2 in response to the inquiry of "Is this road is easy to drive?" with respect to the evaluation information of "This road is difficult to drive" (step ST203). When an affirmative answer such as "Yes" or "Yeah" is obtained in response to the inquiry of "Is this road easy to drive?", the inquiry result acquiring unit 23 determines that the evaluation information is invalid since an inquiry opposite to the evaluation information has been made.

As described above, according to the second embodiment, the evaluation information collecting device 10 further includes the inquiring unit 20 for inquiring of a user as to whether the evaluation information acquired by the evaluation information acquiring unit 11 is valid and determining validity. Therefore, evaluation information whose validity can be objectively determined can be made so as not to be presented automatically without a user's effort while, for evaluation information whose validity cannot be objectively determined, its validity can be determined more accurately by making an inquiry to the user.

Third Embodiment

In the first and the second embodiments described above, the content of evaluation information is changed such that the evaluation information determined to be invalid is not presented immediately. Therefore, the evaluation information is not presented when the evaluation information is determined to be invalid only once. However, if determination of one user immediately prevents presentation when determination of validity is dependent on individual differences, there is a possibility that even evaluation information useful for other users may not be presented, which is not preferable. For example, when a person evaluates that "This road is difficult to run" for a mountain pass road that bends and twists and then another person evaluates that "the bent and twisted road is a fun", there is a possibility that the evaluation information of "This road is difficult to run" is determined to be invalid and thus is not presented.

In order to avoid the situation as described above, in an evaluation information collecting system according to a third embodiment, a change content generating unit 16 changes content of the evaluation information stored in the evaluation information storing unit 1 such that the evaluation information is not easily presented as the number of times the evaluation information is determined to be invalid increases.

Specifically, whether there is an individual difference in validity determination of evaluation information is determined in a step prior to that of the change content generating unit 16 and, in a case of evaluation information with individual differences, unlikeliness of presentation is changed in accordance with validity determination results of a plurality of users. This avoids useful evaluation information immediately not being presented.

Figure 10:
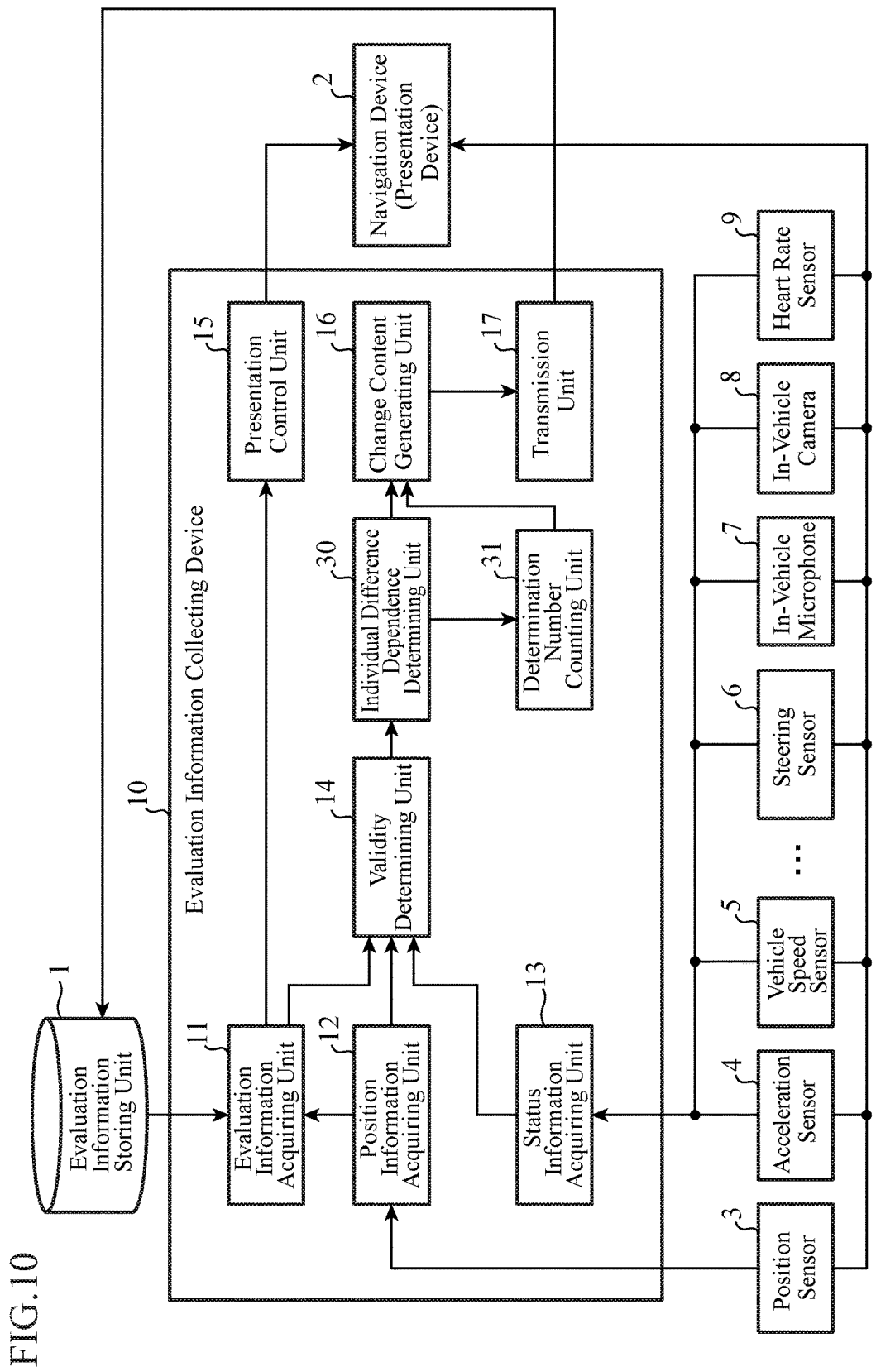
FIG. 10 is a block diagram illustrating an exemplary configuration of an evaluation information collecting system according to a third embodiment of the invention.

FIG. 10 is a block diagram illustrating an exemplary configuration of the evaluation information collecting system according to the third embodiment of the invention. The evaluation information collecting system according to the third embodiment has a configuration in which an individual difference dependence determining unit 30 and a determination number counting unit 31 are added to the evaluation information collecting device 10 of the first embodiment illustrated in FIG. 1. In FIG. 10, the same or corresponding parts as those in FIG. 1 are denoted by the same symbols and descriptions thereof are omitted.

In addition to the content of the evaluation information illustrated in FIG. 3, an evaluation information storing unit 1 according to the third embodiment stores therein the number of times the determination number counting unit 31 has determined that it is invalid in association with the evaluation information. Like the other information, this information of the number of times can be acquired at the same time when the evaluation information acquiring unit 11 acquires the evaluation information.

The individual difference dependence determining unit 30 receives a validity determination result that the evaluation information is invalid from a validity determining unit 14 and determines whether the validity determination is dependent on individual differences. The individual difference dependence determining unit 30 determines that evaluation information of a type that does not generate individual differences, such as presence of a construction or an accident, not to be dependent on individual differences and outputs a command to change evaluation information determined to be invalid so as not to be presented easily to a change content generating unit 16. Meanwhile, evaluation information of types such as a view is determined to be dependent on individual differences. The individual difference dependence determining unit 30 outputs an individual dependence determination result of the evaluation information to the determination number counting unit 31.

The determination number counting unit 31 receives the individual dependence determination result of the evaluation information from the individual difference dependence determining unit 30. When it is determined that the validity determination of the evaluation information is dependent on individual differences, the determination number counting unit 31 compares information of the number of times associated with the evaluation information with a predetermined threshold value. When the number of times determined as invalid is less than the threshold value, the determination number counting unit 31 commands the change content generating unit 16 to generate information to change the number of times the evaluation information stored in the evaluation information storing unit 1 is determined to be invalid. On the other hand, when the number of times determined as invalid is larger than or equal to the threshold value, the determination number counting unit 31 outputs a command to change the evaluation information so as not to be presented easily to the change content generating unit 16.

When the change content generating unit 16 is commanded to change the evaluation information so as not to be presented easily from the individual difference dependence determining unit 30 or the determination number counting unit 31, the change content generating unit 16 generates information to change the evaluation information so as not to be presented easily and outputs the information to the transmission unit 17. Furthermore, when the change content generating unit 16 is commanded from the determination number counting unit 31 to generate information for changing the number of times the evaluation information is determined to be invalid, the change content generating unit 16 generates information for changing the number of times the evaluation information stored in the evaluation information storing unit 1 is determined to be invalid in accordance with the command and outputs the information to the transmission unit 17.

Figure 11:
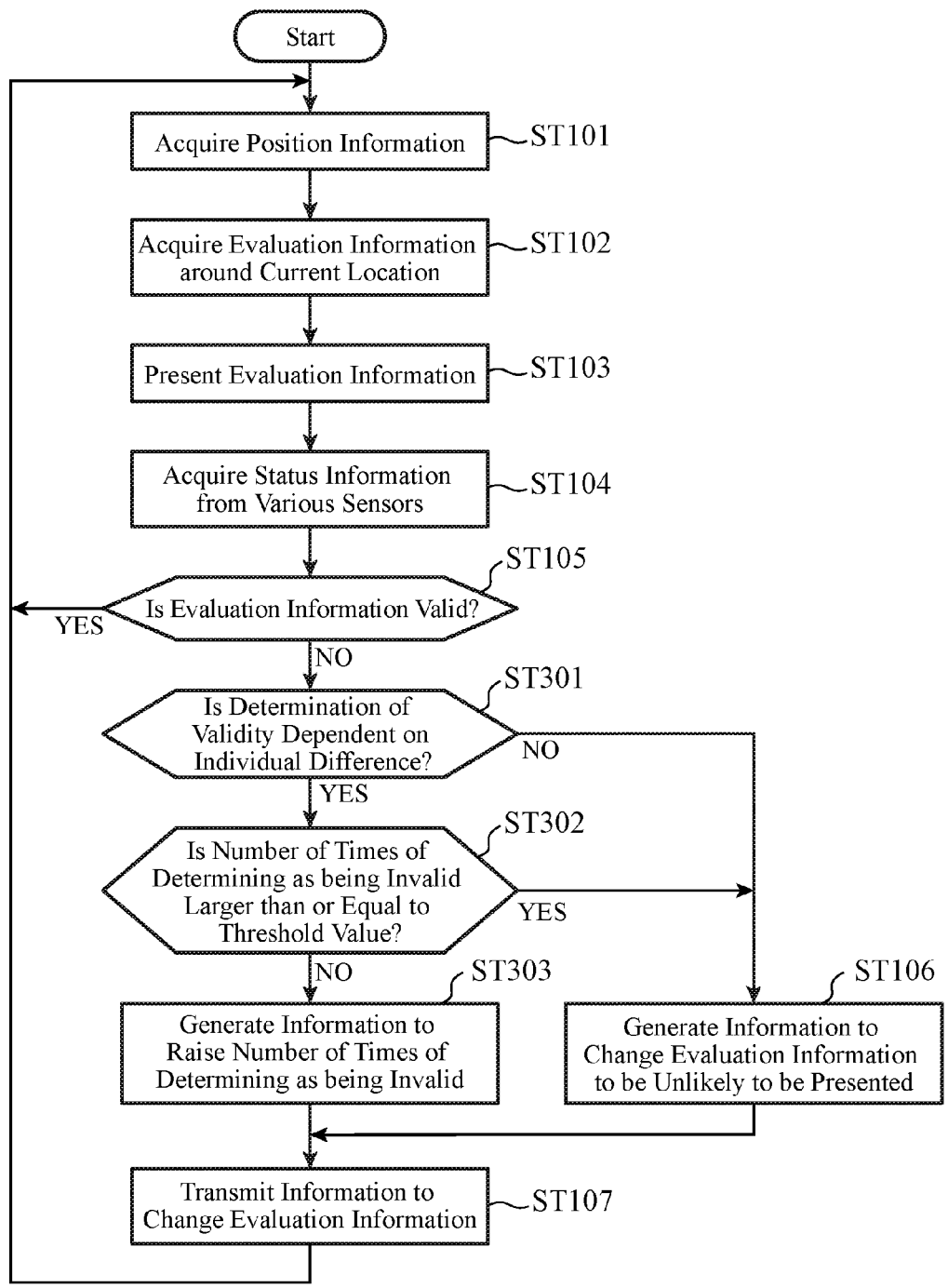
FIG. 11 is a flowchart illustrating operations of the evaluation information collecting device according to the third embodiment.

Next, with reference to a flowchart illustrated in FIG. 11, operations of the evaluation information collecting device 10 according to the third embodiment will be described. Here, steps ST101 to ST107 illustrated in FIG. 11 are the same as the flowchart illustrated in FIG. 5 of the first embodiment and thus descriptions thereof are omitted.

In step ST105, if the validity determining unit 14 determines that evaluation information is invalid ("NO" in step ST105), the individual difference dependence determining unit 30 receives the validity determination result and determines whether validity determination of the evaluation information is dependent on individual differences (step ST301). If not dependent on individual differences ("NO" in step ST301), the individual difference dependence determining unit 30 outputs a command to change the evaluation information so as not to be presented easily to the change content generating unit 16 regardless of the number of times the evaluation information is determined to be invalid. When receiving this command, the change content generating unit 16 generates information to change the evaluation information so as not to be presented easily (step ST106) and transmits the information from the transmission unit 17 to the evaluation information storing unit 1 (step ST107).

On the other hand, if dependent on individual differences ("YES" in step ST301), the individual difference dependence determining unit 30 outputs the individual difference dependence determination result of the evaluation information to the determination number counting unit 31. Subsequently, the determination number counting unit 31 compares the number of times determined as invalid, which is associated with the evaluation information, with a predetermined threshold value (step ST302). When the number of times determined as invalid is larger than or equal to the threshold value ("YES" in step ST302), a command to change the evaluation information so as not to be presented easily is output from the determination number counting unit 31 to the change content generating unit 16. When receiving this command, the change content generating unit 16 generates information to change the evaluation information so as not to be presented easily (step ST106) and transmits the information from the transmission unit 17 to the evaluation information storing unit 1 (step ST107).

When the number of times determined as invalid is less than the threshold value ("NO" in step ST302), the determination number counting unit 31 commands the change content generating unit 16 to generate information to increment the number of times of the evaluation information stored in the evaluation information storing unit 1 by one. Subsequently, the change content generating unit 16 generates information to increase the number of times determined as invalid in accordance with the command of the determination number counting unit 31 (step ST303) and transmits the information from the transmission unit 17 to the evaluation information storing unit 1 (step ST107).

Note that, in the flowchart illustrated in FIG. 11, the processing of presenting the evaluation information is performed in step ST103; however, the evaluation information may not be presented at this timing. The processing of presenting the evaluation information may be performed when the evaluation information is determined to be valid in step ST105, for example ("YES" in step ST105).

In the flowchart illustrated in FIG. 11, if the number of times determined as invalid in step ST302 is larger than or equal to a predetermined threshold value ("YES" in step ST302), the determination number counting unit 31 outputs a command to change the evaluation information so as not to be presented easily to the change content generating unit 16; however, a command to delete the evaluation information may be output.

As described above, according to the third embodiment, the evaluation information collecting device 10 further includes: the individual difference dependence determining unit 30 for determining whether the determination of the validity of the evaluation information acquired by the evaluation information acquiring unit 11 is dependent on an individual difference; and a determination number counting unit 31 for counting the number of times the validity determining unit 14 determines that the evaluation information is invalid. The change content generating unit 16 changes content of the evaluation information stored in the evaluation information storing unit 1 in accordance with the determination result of the individual difference dependence determining unit 30 and the number of times of the determination number counting unit 31. Specifically, the change content generating unit 16 changes the content of the evaluation information determined by the individual difference dependence determining unit 30 to be dependent on an individual difference such that the content is not easily presented when the number of times of the determination number counting unit 31 is larger than or equal to a threshold value. As a result of this, when there are individual differences in validity determination of the evaluation information, the evaluation information is not easily presented when it is determined to be invalid for a plurality of times on the basis of the validity determination results of a plurality of persons, thereby preventing useful evaluation information from immediately not being presented by determination by one person.

In addition, according to the third embodiment, the change content generating unit 16 changes the content of the evaluation information, which the individual difference dependence determining unit 30 determines to be not dependent on individual differences, so as not to be presented easily regardless of the number of times of the determination number counting unit 31. Therefore, evaluation information whose validity can be objectively determined is not presented immediately after it is once determined to be invalid and only valid evaluation information is presented.

Note that, in the third embodiment, the change content generating unit 16 may delete the evaluation information stored in the evaluation information storing unit 1 when the number of times the validity determining unit 14 determines that the evaluation information is invalid is larger than or equal to a threshold value. With this configuration, it is possible to prevent a situation in which useful evaluation information is immediately deleted by determination of one person when evaluation information has individual differences in validity determination.

In the above description, the configuration example in which the first embodiment is combined with the third embodiment is illustrated; however, the second embodiment may be combined with the third embodiment. In this case, the individual difference dependence determining unit 30 and the determination number counting unit 31 are provided between the inquiry necessity determining unit 21 and the change content generating unit 16 and between the inquiry result acquiring unit 23 and the change content generating unit 16 illustrated in FIG. 8.

Fourth Embodiment

In the first and the second embodiments, there is only one status of presenting evaluation information or not presenting evaluation information. However, the evaluation information may be information corresponding to a wide range of area, or may be information corresponding only to a limited location. For example, when there is evaluation information of "beautiful view", there is a case where moving a vehicle a little away from a point where this evaluation information is registered makes the view invisible being obscured by houses, a forest, or the like, thereby making the evaluation information invalid.

In order to avoid the situation as described above, in an evaluation information collecting system according to a fourth embodiment, a change content generating unit 16 changes content of the evaluation information stored in the evaluation information storing unit 1 such that the evaluation information is not easily presented as the number of times the evaluation information is determined to be invalid increases.

Figure 12A:
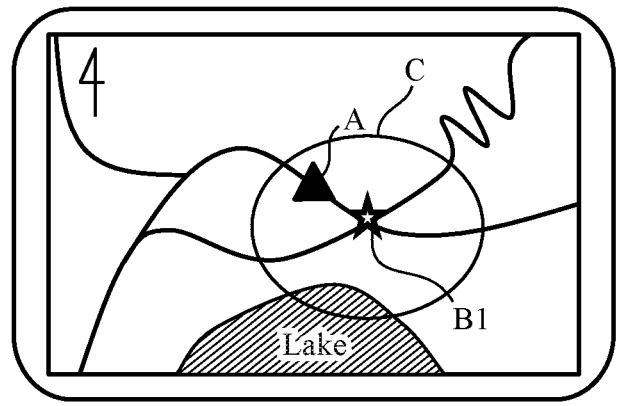
FIGS. 12A, 12B, and 12C are diagrams illustrating an exemplary screen of a map that a navigation device displays on a display in an evaluation information collecting system according to a fourth embodiment of the invention.
Figure 12B:
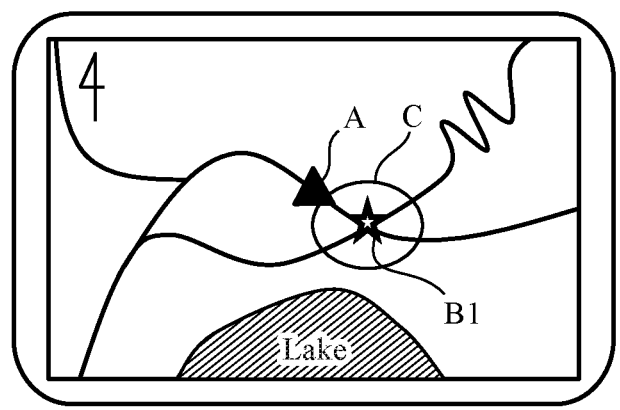
Figure 12C:
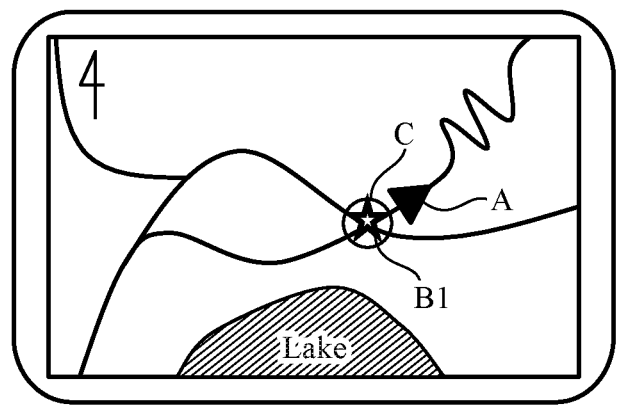

Specifically, in the evaluation information collecting system according to the fourth embodiment, as illustrated in FIG. 12A, a range of a certain distance from a registration point of the evaluation information B1 is first set as a presentation range C for presenting the evaluation information B1. Then, when the evaluation information B1 is determined to be invalid, the presentation range C is narrowed as illustrated in FIG. 12B. As a result of this, for the evaluation information B1 an applicable range of which is limited, the presentation range C is gradually narrowed in the order of FIGS. 12A, 12B, and 12C in accordance with determination results of not being valid of a plurality of times. As a result, the presentation range C can be presented only within the applicable range.

Figure 13:
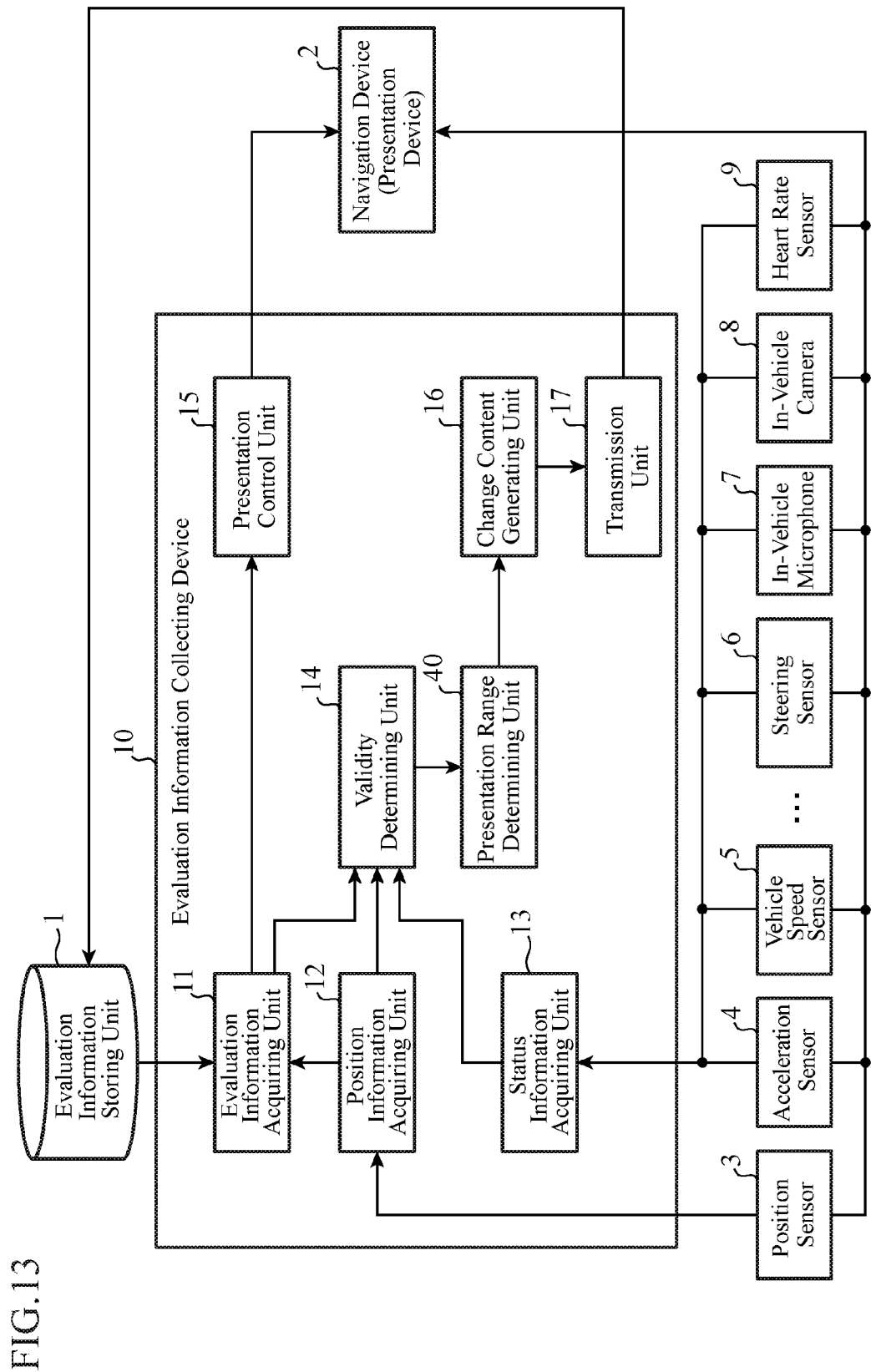
FIG. 13 is a block diagram illustrating an exemplary configuration of the evaluation information collecting system according to the fourth embodiment of the invention.

FIG. 13 is a block diagram illustrating an exemplary configuration of the evaluation information collecting system according to the fourth embodiment of the invention. The evaluation information collecting system according to the fourth embodiment has a configuration in which a presentation range determining unit 40 is added to the evaluation information collecting device 10 of the first embodiment illustrated in FIG. 1. In FIG. 13, the same or corresponding parts as those in FIG. 1 are denoted by the same symbols and descriptions thereof are omitted.

In addition to the content of the evaluation information illustrated in FIG. 3, the evaluation information storing unit 1 of the fourth embodiment stores therein a presentation range determined by the presentation range determining unit 40 in association with the evaluation information. Like the other information, this information of the presentation range can be acquired at the same time when the evaluation information acquiring unit 11 acquires the evaluation information.

Hereinafter, it is assumed that a presentation range is represented by a radius of a circle having the center on a registration point.

The presentation range determining unit 40 receives a validity determination result of the evaluation information from the validity determining unit 14. When the evaluation information is determined to be invalid, the presentation range determining unit 40 compares a radius of a circle of a presentation range associated with the evaluation information with a predetermined threshold value. The predetermined threshold value is a threshold value for determining whether to present the evaluation information. For example, in a presentation range small enough for a vehicle to pass therethrough in a moment, the evaluation information of a range small is presented for a moment and disappears immediately and it is meaningless to present the evaluation information. Therefore, the evaluation information is not presented using the threshold value.

When the radius of the circle of the presentation range is less than or equal to the threshold value, the presentation range determining unit 40 outputs to the change content generating unit 16 a command to change the evaluation information so as not to be presented easily. On the other hand, when the radius of the circle of the presentation range is larger than the threshold value, the presentation range determining unit 40 commands the change content generating unit 16 to generate information for reducing the radius of the circle of the presentation range. The method of reduction may be any method. For example, the radius of the circle may be reduced by a certain distance each time the evaluation information is determined to be invalid, or the radius of the circle may be reduced so as not to include a point where the evaluation information has been determined to be invalid. Although it is assumed that the presentation range is a circle in the descriptions; however, the presentation range may have any shape.

In accordance with the command from the presentation range determining unit 40, the change content generating unit 16 generates information for changing the presentation range of the evaluation information stored in the evaluation information storing unit 1 to be reduced or information for changing evaluation information so as not to be presented easily and outputs the information to the transmission unit 17.

Figure 14:
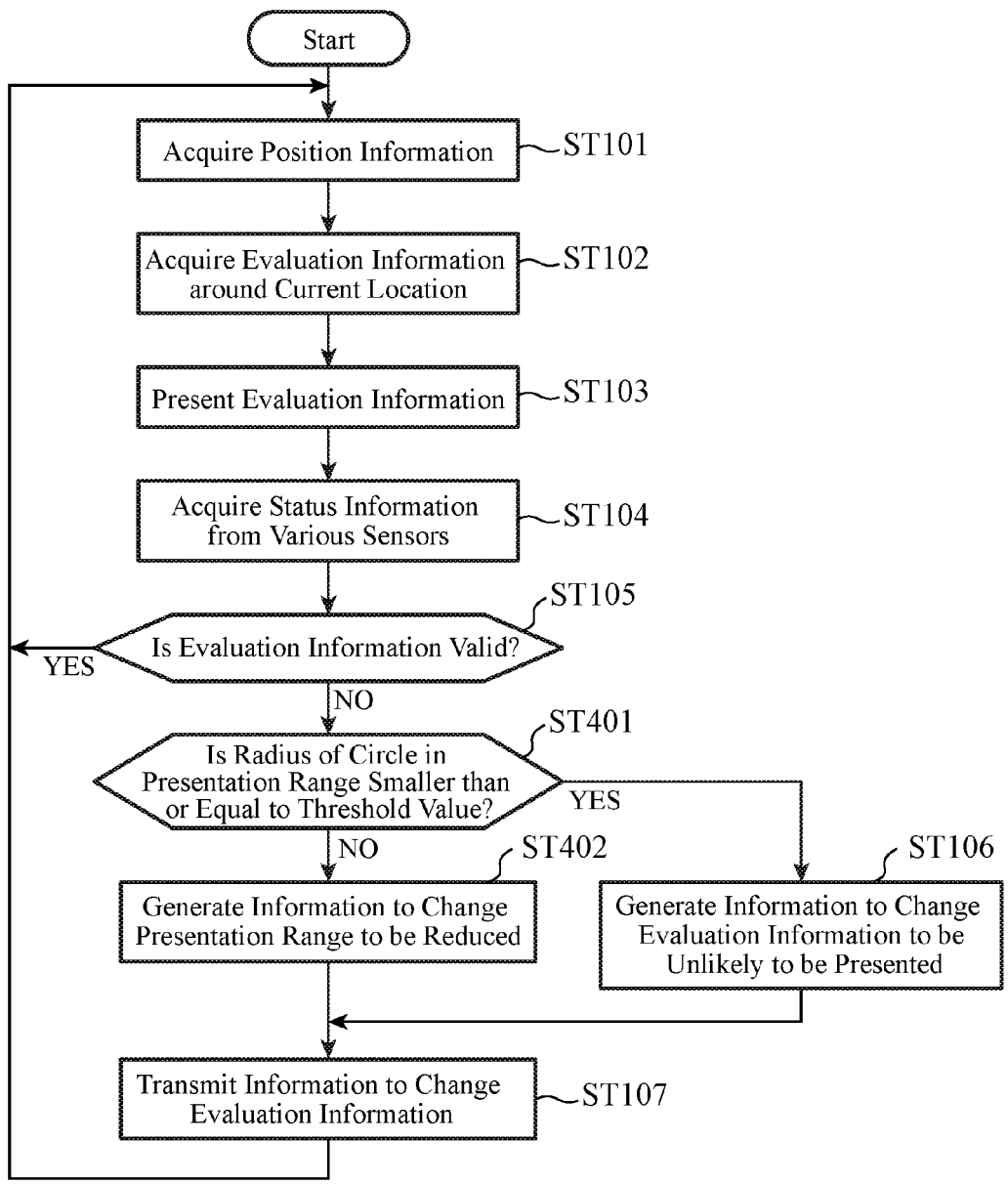
FIG. 14 is a flowchart illustrating operations of the evaluation information collecting device according to the fourth embodiment.

Next, with reference to a flowchart illustrated in FIG. 14, operations of the evaluation information collecting device 10 according to the fourth embodiment will be described. Here, steps ST101 to ST107 illustrated in FIG. 14 are the same as the flowchart illustrated in FIG. 5 of the first embodiment and thus descriptions thereof are omitted.

In step ST105, if the validity determining unit 14 determines that evaluation information is invalid ("NO" in step ST105), the presentation range determining unit 40 receives the validity determination result and compares a radius of a circle of a presentation range associated with the evaluation information with a predetermined threshold value (step ST401). When the radius of the circle of the presentation range is smaller than or equal to the threshold value ("YES" in step ST401), a command to change the evaluation information so as not to be presented easily is output from the presentation range determining unit 40 to the change content generating unit 16. When receiving this command, the change content generating unit 16 generates information to change the evaluation information so as not to be presented easily (step ST106) and transmits the information from the transmission unit 17 to the evaluation information storing unit 1 (step ST107).

When the radius of the circle of the presentation range is larger than the threshold value ("NO" in step ST401), the presentation range determining unit 40 commands the change content generating unit 16 to generate information for reducing the presentation range of the evaluation information stored in the evaluation information storing unit 1. Subsequently, the change content generating unit 16 generates information to change the presentation range to be reduced in accordance with the command of the presentation range determining unit 40 (step ST402) and transmits the information from the transmission unit 17 to the evaluation information storing unit 1 (step ST107).

Next, the processing having been described with the flowchart in FIG. 14 will be described below with a specific example.

Here, an example where evaluation information B1 of "beautiful lake" exists around a user's vehicle position A in FIG. 12, however, the lake is hard to see from other points than a point where roads intersect will be described.

When the user's vehicle approaches a point where this evaluation information B1 is registered, the evaluation information acquiring unit 11 first acquires the evaluation information B1 of "beautiful lake" on the vicinity of the current location (steps ST101 and ST102).

Subsequently, the evaluation information acquiring unit 11 outputs the evaluation information B1 to the presentation control unit 15 and the presentation control unit 15 commands the navigation device 2 to display, in a superimposed manner, the evaluation information B1 of "beautiful lake" on a map displayed on a display by a navigation device 2 (step ST103).

Subsequently, the status information acquiring unit 13 acquires the status information from the various sensors (step ST104). Here, it is assumed that the status information acquired by the status information acquiring unit 13 is a conversation with negative content such as "where" or "There is no lake" collected by an in-vehicle microphone 7.

Subsequently, the validity determining unit 14 determines validity of the evaluation information B1 on the basis of the status information acquired by the status information acquiring unit 13 (step ST105). Here, since the conversation in the vehicle has a negative evaluation content, this evaluation information B1 is determined to be invalid ("NO" in step ST105).

Subsequently, the presentation range determining unit 40 determines whether the radius of the circle of the presentation range C in which the evaluation information B1 of "beautiful lake" is presented is less than or equal to a threshold value (step ST401). If the radius of the circle of the presentation range C is larger than the threshold value ("NO" in step ST401), the presentation range determining unit 40 commands the change content generating unit 16 to generate information to change the presentation range C to be reduced (step ST402). On the other hand, if the radius of the circle of the presentation range C is smaller than or equal to the threshold value ("YES" in step ST401), the presentation range determining unit 40 commands the change content generating unit 16 to generate information to change the evaluation information B1 so as not to be presented easily (step ST106).

Lastly, the information for changing the evaluation information generated by the change content generating unit 16 is transmitted from the transmission unit 17 to the evaluation information storing unit 1 (step ST107) and the evaluation information storing unit 1 changes content of the stored evaluation information in accordance with the information.

As described above, according to the fourth embodiment, the evaluation information collecting device 10 further includes the presentation range determining unit 40 for reducing a presentation range for presenting evaluation information when the validity determining unit 14 determines that the evaluation information is invalid. The change content generating unit 16 changes a presentation range of the evaluation information stored in the evaluation information storing unit 1 to the presentation range reduced by the presentation range determining unit 40. Therefore, for evaluation information an applicable range of which is limited, a presentation range is gradually narrowed in accordance with determination results of not being valid of a plurality of times. As a result, the presentation range can be presented only within the applicable range.

Note that in the above description the configuration example in which the first embodiment is combined with the fourth embodiment is illustrated; however, the second embodiment may be combined with the fourth embodiment. In that case, the presentation range determining unit 40 is provided between the inquiry necessity determining unit 21 and the change content generating unit 16 and between the inquiry result acquiring unit 23 and the change content generating unit 16 illustrated in FIG. 8.

Fifth Embodiment

In the first and the second embodiments, a case where validity of evaluation information periodically changes is not considered and once the evaluation information is determined to be invalid, the determination does not change thereafter. Therefore, for example at a point where a traffic is congested every Saturday in the evening, evaluation information of the congestion is registered every Saturday in the evening and then is determined to be invalid in the night of that day and thus is not presented thereafter. Thus, the registered evaluation information is not used effectively.

Therefore, in an evaluation information collecting system according to a fifth embodiment, by assuming that periodicity exists in evaluation information and invalidating a time zone during which the evaluation information is determined to be invalid for each piece of evaluation information, evaluation information registered in the evaluation information storing unit 1 is prevented from not being presented or from being deleted by being determined to be invalid immediately after registration thereof.

Figure 15:
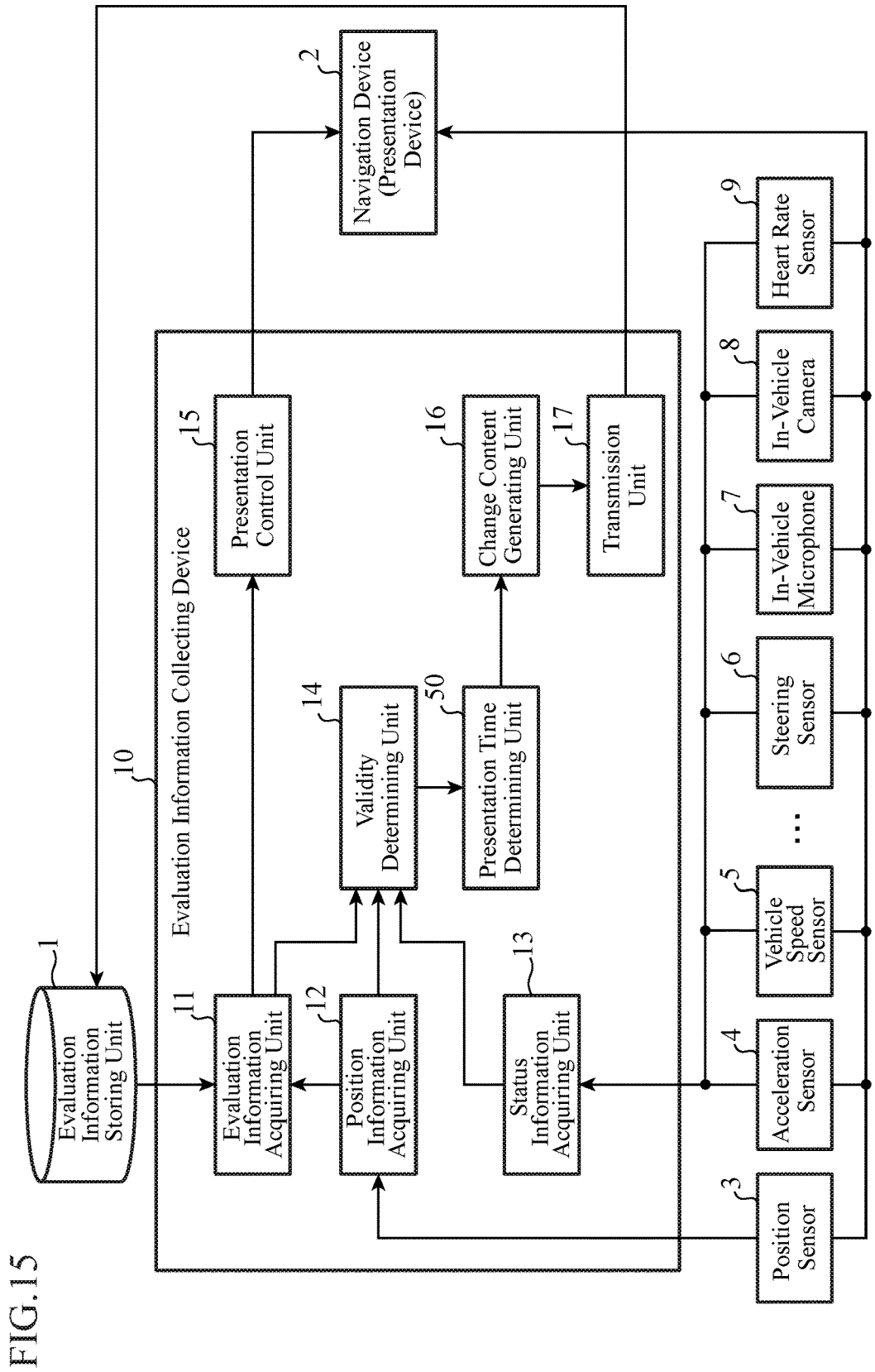
FIG. 15 is a block diagram illustrating an exemplary configuration of an evaluation information collecting system according to a fifth embodiment of the invention.

FIG. 15 is a block diagram illustrating an exemplary configuration of the evaluation information collecting system according to the fifth embodiment of the invention. The evaluation information collecting system according to the fifth embodiment has a configuration in which a presentation time determining unit 50 is added to the evaluation information collecting device 10 of the first embodiment illustrated in FIG. 1. In FIG. 15, the same or corresponding parts as those in FIG. 1 are denoted by the same symbols and descriptions thereof are omitted.

FIG. 16 is a diagram illustrating exemplary evaluation information stored in the evaluation information storing unit 1 of the fifth embodiment. In addition to the content of the evaluation information illustrated in FIG. 3, the evaluation information storing unit 1 of the fifth embodiment stores therein information of effective time zone as illustrated in FIG. 16 in association with the evaluation information. Note that In FIG. 16, information such as "positive negative determination" and "type" is omitted.

The information of the effective time zone is not registered when the evaluation information is registered in the evaluation information storing unit 1. When an effective time zone is not registered, presentation of evaluation information is effective in all time zones. When an effective time zone is registered, presentation of evaluation information is effective in the registered time zone and is ineffective in the other time zones.

When the validity determining unit 14 of the evaluation information collecting device 10 determines that the evaluation information is invalid, the effective time zones of the evaluation information are changed from those in FIG. 16 to those in FIGS. 17 to 19. As will be described later in detail, for example when "18:00 to 23:00" is registered in "effective time zone (daily)" in FIG. 17, presentation of this evaluation information is effective every day from 18:00 to 23:00. Although illustration is omitted, effective time zones may be registered in units of "every year", "holidays", "weekdays", "Mondays", or the like.

The presentation time determining unit 50 receives the validity determination result of the evaluation information from the validity determining unit 14. The presentation time determining unit 50 estimates a cycle after which the evaluation information becomes valid on the basis of the registration date and time associated with the evaluation information and the determination date and time when the validity determining unit 14 has determined the evaluation information to be invalid and determines an effective time zone for presenting the evaluation information on the basis of the estimation result. The presentation time determining unit 50 commands the change content generating unit 16 to generate information for changing the effective time zone of the evaluation information.

In accordance with the command from the presentation time determining unit 50, the change content generating unit 16 generates information for changing the effective time zone of the evaluation information stored in the evaluation information storing unit 1 and outputs the information to the transmission unit 17.

For example, it is assumed that the evaluation information illustrated in FIG. 16 has been registered in the evaluation information storing unit 1 at 18:00 on Saturday, Oct. 11, 2014. The effective time zone of this evaluation information has an initial value, that is, has not been registered yet.

For example when this evaluation information is determined to be invalid at 23:00 on Saturday, October 11 which is within 24 hours after registration, "effective time zone (daily)" is "18:00 to 23:00" as illustrated in FIG. 17 and after 23:00 presentation becomes ineffective. Also, on the basis of the above determination date and time, "effective time zone (weekly)" is "Saturdays, 18:00 to 23:00" and "effective time zone (monthly)" is "11th, 18:00 to 23:00".

Although not illustrated, when there is no determination of being invalid within 24 hours as described above but instead, for example, when this evaluation information is determined for the first time to be invalid at 23:00 on Sunday, October 12 when 24 hours or more has passed since registration, "effective time zone (daily)" a period of which is shorter than a time interval from the registration date and time to determination date and time is determined to have no periodicity and thus "effective time zone (daily)" becomes ineffective. On the other hand, the "effective time zone (weekly)" whose period is longer than the above time interval is determined to have periodicity of the day of the week and changed to "Saturdays, 18:00 to Sundays, 23:00". The "effective time zone (monthly)" is determined to have periodicity of the date and changed to "11th, 18:00 to 12th, 23:00".

Subsequently, when the evaluation information is determined to be invalid at 18:00 on Sunday, October 12 after having been determined to be invalid at 23:00 on Saturday, October 11 as described above, "effective time zone (daily)" becomes "18:00 to 18:00" and the effective time zone disappears. Therefore, "effective time zone (daily)" is changed to "x" indicating ineffectiveness as shown in FIG. 18. Meanwhile, "effective time zone (weekly)" and "effective time zone (monthly)" are not influenced because the day of the week and the date are different.

Subsequently, when the evaluation information is determined to be invalid at 21:00 on Saturday, October 18 after having been determined to be invalid at 18:00 on Saturday, October 12 as described above, "Saturdays, 18:00 to 23:00" of "effective time zone (weekly)" shown in FIG. 18 is changed to "Saturdays, 18:00 to 21:00" as shown in FIG. 19 since the days of the week coincide.

Next, with reference to a flowchart illustrated in FIG. 20, operations of the evaluation information collecting device 10 according to the fifth embodiment will be described. Here, steps ST101 to ST105 and ST107 illustrated in FIG. 20 are the same as the flowchart illustrated in FIG. 5 of the first embodiment and thus descriptions thereof are omitted.

In step ST105, if the validity determining unit 14 determines that evaluation information is invalid ("NO" in step ST105), the presentation time determining unit 50 receives the validity determination result and shortens an effective time zone associated with the evaluation information on the basis of date and time when the evaluation information has been determined to be invalid (step ST501). Subsequently, the presentation time determining unit 50 commands the change content generating unit 16 to generate information to shorten the effective time zone of the evaluation information stored in the evaluation information storing unit 1. Subsequently, the change content generating unit 16 generates information for changing the effective time zone to be shortened in accordance with the command of the presentation time determining unit 50 (step ST502) and transmits the information from the transmission unit 17 to the evaluation information storing unit 1 (step ST107).

Next, the processing having been described with the flowchart in FIG. 20 will be described below with a specific example.

Here, it is assumed that there is a point with a large traffic volume from 17:00 to 21:00 every Saturday. Regarding this point, it is assumed that evaluation information having content of "congested" has been already registered on Saturday, Oct. 11, 2014, at 18:00 as illustrated in FIG. 16.

When the user's vehicle approaches a point where this evaluation information is registered, the evaluation information acquiring unit 11 first acquires the evaluation information of "congested" on the vicinity of the current location (steps ST101 and ST102).

Subsequently, the evaluation information acquiring unit 11 outputs the evaluation information to the presentation control unit 15 and the presentation control unit 15 commands the navigation device 2 to display, in a superimposed manner, the evaluation information of "congested" on a map displayed on a display by a navigation device 2 (step ST103).

Subsequently, the status information acquiring unit 13 acquires the status information from the various sensors (step ST104). Here, it is assumed that the status information acquired by the status information acquiring unit 13 is a conversation with content contradicting the evaluation information such as "no car at all" collected by an in-vehicle microphone 7.

Subsequently, the validity determining unit 14 determines validity of the evaluation information on the basis of the status information acquired by the status information acquiring unit 13 (step ST105). In this case, since the conversation in the vehicle has evaluation content denying the evaluation information of "congested", the evaluation information and the status information are determined to be inconsistent and the evaluation information is determined to be invalid ("NO" in step ST105).

Subsequently, the presentation time determining unit 50 determines a time zone during which presentation is effective on the basis of the date and time when the evaluation information has been determined to be invalid (step ST501). When the evaluation information is determined for the first time to be invalid, the presentation time determining unit 50 determines, from a time interval between a date and time when the evaluation information has been registered and the date and time when the evaluation information has been determined to be invalid, any "effective time zone" less than this time interval to be ineffective. For example, when the time interval is one hour or more and less than 24 hours, "effective time zone (hourly)" is ineffective and "effective time zone (daily)" is effective. In this manner, the presentation time determining unit 50 determines each "effective time zone" on the basis of the time interval between the date and time when the evaluation information has been registered and the date and time when the evaluation information has been determined to be invalid.

Here, since the evaluation information has been registered at 18:00 on Saturday, October 11 and has determined to be invalid at 23:00 on Saturday, October 11, effective time zones are as illustrated in FIG. 17.

Note that, in a case where determination that the evaluation information is invalid is the second or subsequent determination, the presentation time determining unit 50 changes an effective time zone stored in association with the evaluation information to be shortened. For example, when "18:00 to 23:00" is already registered in "effective time zone (daily)" as illustrated in FIG. 17 and then the evaluation information is determined to be invalid at 18:00 on Sunday, October 12, the presentation time determining unit 50 shortens the time zone of this "effective time zone (daily)" and changes it to be ineffective as illustrated in FIG. 18. There is no influence on "effective time zone (weekly)" and "effective time zone (monthly)".

Subsequently, the change content generating unit 16 generates information for changing the effective time zone of the evaluation information to be shortened in accordance with the command of the presentation time determining unit 50 (step ST502) and transmits the information from the transmission unit 17 to the evaluation information storing unit 1 (step ST107). The evaluation information storing unit 1 changes the content of the stored evaluation information in accordance with this information.

As described above, according to the fifth embodiment, the evaluation information collecting device 10 further includes: the presentation time determining unit 50 for estimating a cycle after which the evaluation information becomes valid on the basis of the registration date and time when the evaluation information has been registered in the evaluation information storing unit 1 and the determination date and time when the validity determining unit 14 has determined the evaluation information to be invalid and determining a time zone for presenting the evaluation information on the basis of the cycle. The change content generating unit 16 changes a time zone for presenting the evaluation information stored in the evaluation information storing unit 1 to the time zone determined by the presentation time determining unit 50. Therefore, it is possible to reflect a change in situation in the evaluation information and to periodically present the evaluation information, thus allowing the registered evaluation information to be effectively utilized to its full extent.

Note that in the above description the configuration example in which the first embodiment is combined with the fifth embodiment is illustrated; however, the second embodiment may be combined with the fifth embodiment. In that case, the presentation time determining unit 50 is provided between the inquiry necessity determining unit 21 and the change content generating unit 16 and between the inquiry result acquiring unit 23 and the change content generating unit 16 illustrated in FIG. 8.

Also, in the above description, evaluation information is only changed so as not to be presented easily; however, in addition to this, evaluation information may also be changed to be easily presented. For example, when the validity determining unit 14 determines that the evaluation information is valid, the change content generating unit 16 may generate information to change the evaluation information to be easily presented and transmit the information from the transmission unit 17 to the evaluation information storing unit 1.

Other than the descriptions above, within the scope of the present invention, the present invention may include a flexible combination of the respective embodiments, a modification of any component of the respective embodiments, or omission of any component in the respective embodiments.

INDUSTRIAL APPLICABILITY

The evaluation information collecting system according to the present invention is suitable for use in an evaluation information collecting system for various moving bodies including people, vehicles, railroads, ships, aircraft, and the like.

REFERENCE SIGNS LIST

1: Evaluation information storing unit (storing device), 2: Navigation device (presentation device), 3: Position sensor, 4: Acceleration sensor, 5: Vehicle speed sensor, 6: Steering sensor, 7: In-vehicle microphone, 8: In-vehicle camera, 9: Heart rate sensor, 10: Evaluation information collecting device, 11: Evaluation information acquiring unit, 12: Position information acquiring unit, 13: Status information acquiring unit, 14: Validity determining unit, 15: Presentation control unit, 16: Change content generating unit, 17: Transmission unit, 20: Inquiring unit, 21: Inquiry necessity determining unit, 22: Inquiry content generating unit, 23: Inquiry result acquiring unit, 30: Individual difference dependence determining unit, 31: Determination number counting unit, 40: Presentation range determining unit, 50: Presentation time determining unit, 100: Bus, 101: CPU, 102: ROM, 103: RAM, 104: Communication device, 105: External storing device.

The invention claimed is:

1. An evaluation information collecting device for acquiring, from a storing device storing evaluation information evaluating a certain point, evaluation information associated with a point through which a moving body passes and causing a presentation device to present the evaluation information, the evaluation information collecting device comprising:
an evaluation information acquirer to acquire the evaluation information associated with the point through which the moving body passes from the storing device;
a validity determiner to determine validity of the evaluation information acquired by the evaluation information acquirer on a basis of status information representing a status of the moving body or a user passing through the point associated with the evaluation information;

a change content generator to change content of the evaluation information stored in the storing device such that the evaluation information determined by the validity determiner to be invalid is not easily presented; and a presentation range determiner to reduce a presentation range for presenting the evaluation information when the validity determiner determines that the evaluation information is invalid, wherein the change content generating unit changes content of the evaluation information stored in the storing device such that the evaluation information is not easily presented as the number of times the validity determiner determines that the evaluation information is invalid increases and changes a presentation range of the evaluation information stored in the storing device to a presentation range reduced by the presentation range determiner, and wherein the validity determiner determines validity of the evaluation information on a basis of the status information representing at least one of a status of the moving body, utterance content of the user, and a reaction of the user when the evaluation information acquired by the evaluation information acquirer is presented.

2. The evaluation information collecting device according to claim 1, further comprising:

an inquiring unit to inquire of a user as to whether the evaluation information acquired by the evaluation information acquirer is valid and determine validity of the evaluation information, wherein the change content generating unit changes content of the evaluation information stored in the storing device such that the evaluation information, determined to be invalid by at least one of the validity determiner and the inquiring unit, is not easily presented.

3. The evaluation information collecting device according to claim 1, wherein the change content generating unit deletes the evaluation information stored in the storing device when the number of times the validity determiner determines that the evaluation information is invalid is larger than or equal to a threshold value.

4. The evaluation information collecting device according to claim 1, wherein the presentation range for presenting the evaluation information is a circular range including the point associated with the evaluation information.

5. An evaluation information collecting system, comprising:

a storing device to store evaluation information evaluating a certain point;

a presentation device to present the evaluation information; and an evaluation information collector to acquire evaluation information associated with a point through which a moving body passes from the storing device, determine validity of the evaluation information on a basis of status information representing a status of the moving body or a user passing through the point associated with the evaluation information, change content of the evaluation information stored in the storing device such that the evaluation information determined to be invalid is not easily presented, change a presentation range of the evaluation information stored in the storing device to a reduced presentation range, and further determine validity of the evaluation information on a basis of the status information representing at least one of a status of the moving body, utterance content of the user, and a reaction of the user when the evaluation information acquired by the evaluation information acquirer is presented.

* * * * *